United States Patent [19]
Peters

[11] Patent Number: 6,155,746
[45] Date of Patent: Dec. 5, 2000

[54] FISH LADDER AND ITS CONSTRUCTION

[76] Inventor: Hans Wilhelm Peters, Tegelhof 59, D-33014 Bad Driburg, Germany

[21] Appl. No.: 09/194,699

[22] PCT Filed: Jun. 2, 1997

[86] PCT No.: PCT/EP97/02850

§ 371 Date: Jun. 14, 1999

§ 102(e) Date: Jun. 14, 1999

[87] PCT Pub. No.: WO97/46761

PCT Pub. Date: Dec. 11, 1997

[30] Foreign Application Priority Data

Jun. 1, 1996 [DE] Germany ............................ 196 22 096

[51] Int. Cl.[7] ........................................................ E02B 8/08
[52] U.S. Cl. ............................................... 405/81; 119/219
[58] Field of Search .................................. 405/81, 82, 83; 119/219

[56] References Cited

U.S. PATENT DOCUMENTS

| | | | |
|---|---|---|---|
| 437,202 | 9/1890 | Hockin | 405/81 |
| 1,621,170 | 3/1927 | Landau | 405/81 |
| 1,680,722 | 8/1928 | Bennett et al. | 405/82 |
| 1,730,005 | 10/1929 | Grether . | |
| 3,962,876 | 6/1976 | Philips . | |

OTHER PUBLICATIONS

Jens: "Vertical–slot–rundbeckenfischpaβ aus stahlfertigteilen." Wasser und Boden, Bd. 47, Nr. 3, 1995, pp. 55–59, XP002042709.

Gebler: "Fishchaufstiege, derzeitige Situation und zukunftige Konzeption." Wasserwirtschaft, Bd. 79, Nr. 2, Feb. 1989, pp. 64, 66–68, XP002042710.

Primary Examiner—Eileen D. Lillis
Assistant Examiner—Frederick L. Lagman
Attorney, Agent, or Firm—Browdy and Neimark

[57] ABSTRACT

The invention relates to a fish ladder (1) to by-pass a vertical descent (SH) in a flowing watercourse (31F) or a dam (31T), with an upstream water inlet (2) and a downstream water outlet (3) and with basins (4) arranged between them substantially in the downstream direction, each of which has an inflow slot (5Z) and an outflow slot (5A) as vertical through-flow slots (5) and deviating apparatus (6, 13) to form a meandering passage. The basins (4) have a partially cylindrical inner wall (40). Successive basins (4a, 4b, 4c, 4d) are arranged against one another and mutually laterally offset in such a way that the through-flow slots (5) run transversely to the direction of slope (G). The through-flow slots (5) are bounded on both sides by a first vertical partially cylindrical pipe (60) over the entire height (H) of the basin as a first diversion (6) with a substantially smaller radius in relation to that of the inner wall (40) of the basin.

41 Claims, 16 Drawing Sheets

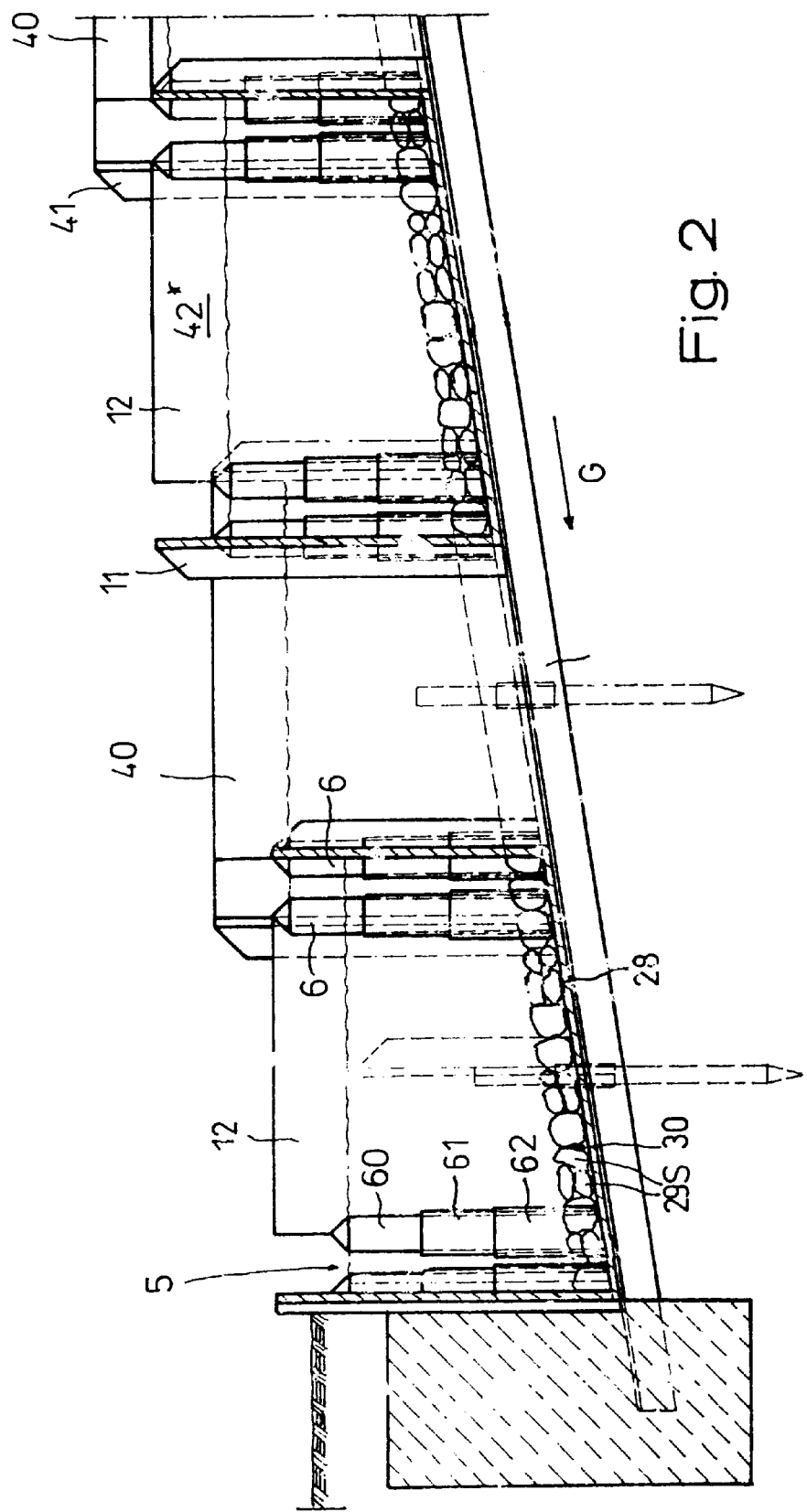

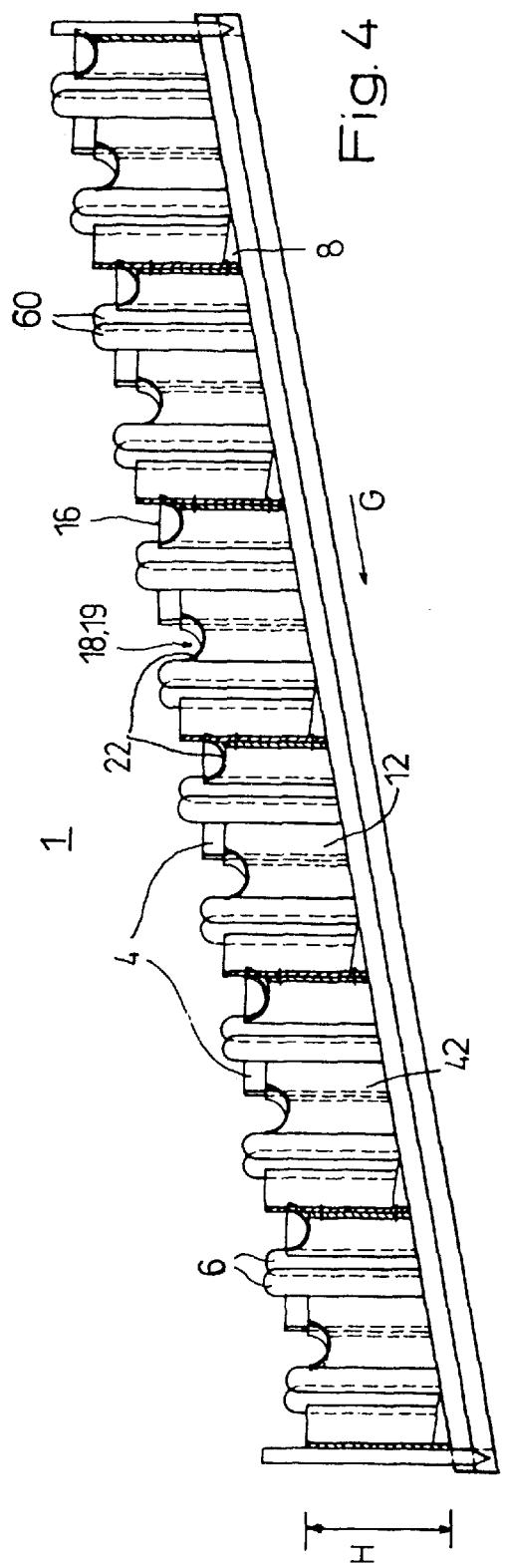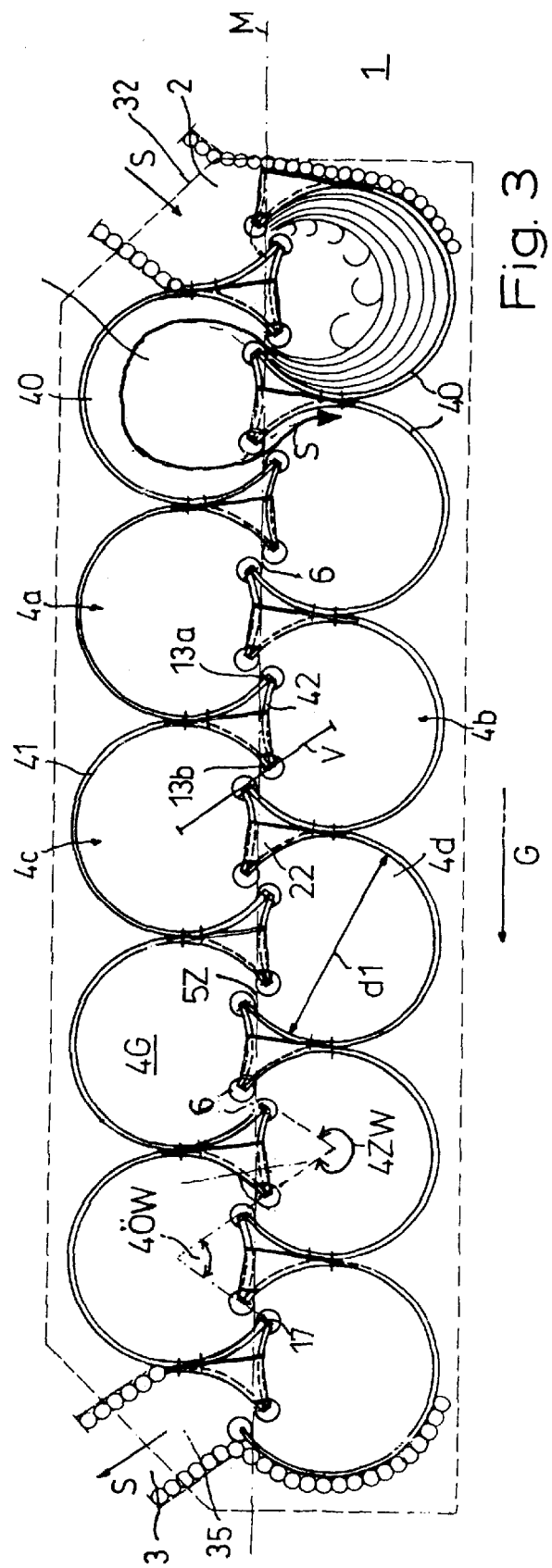

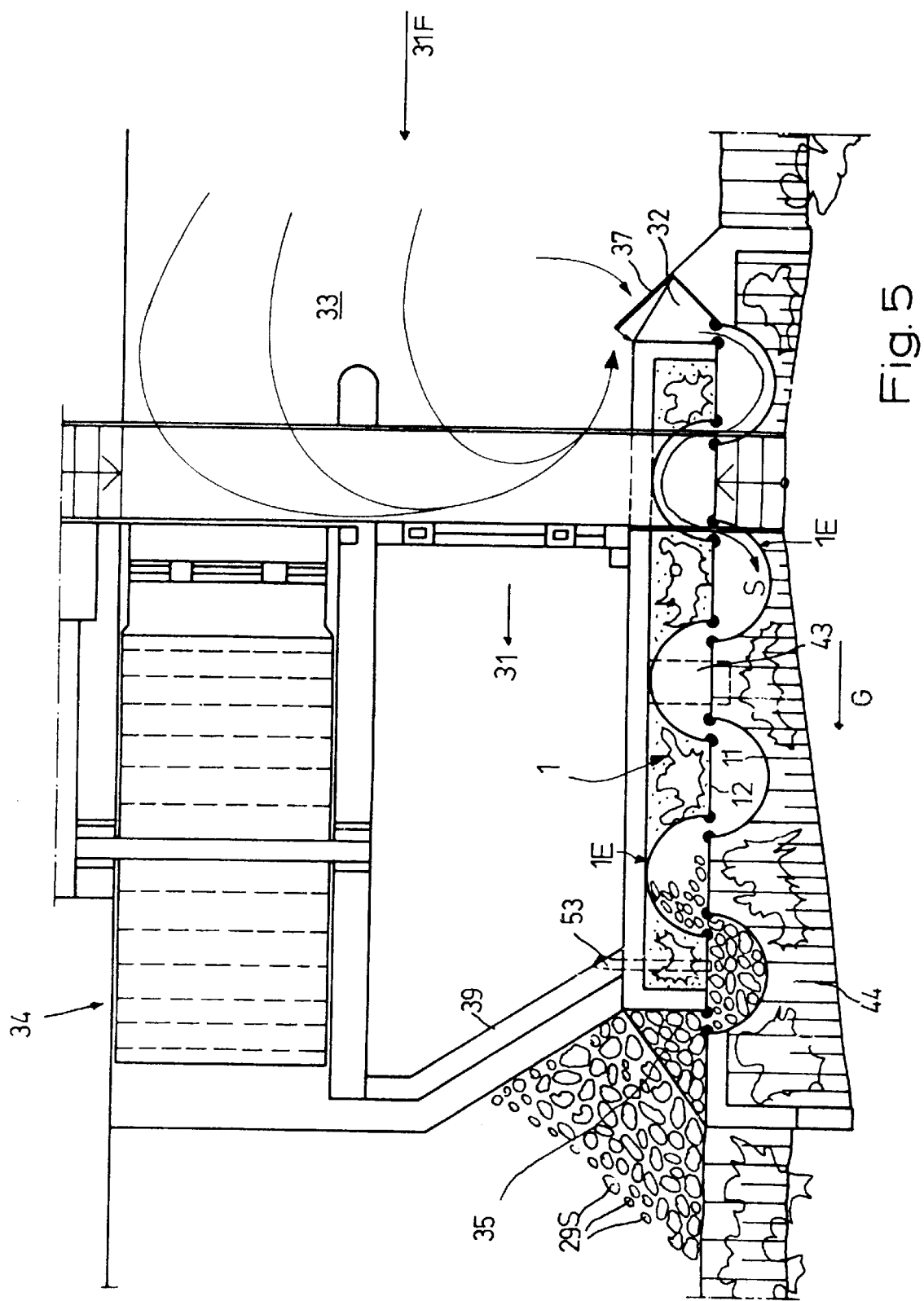

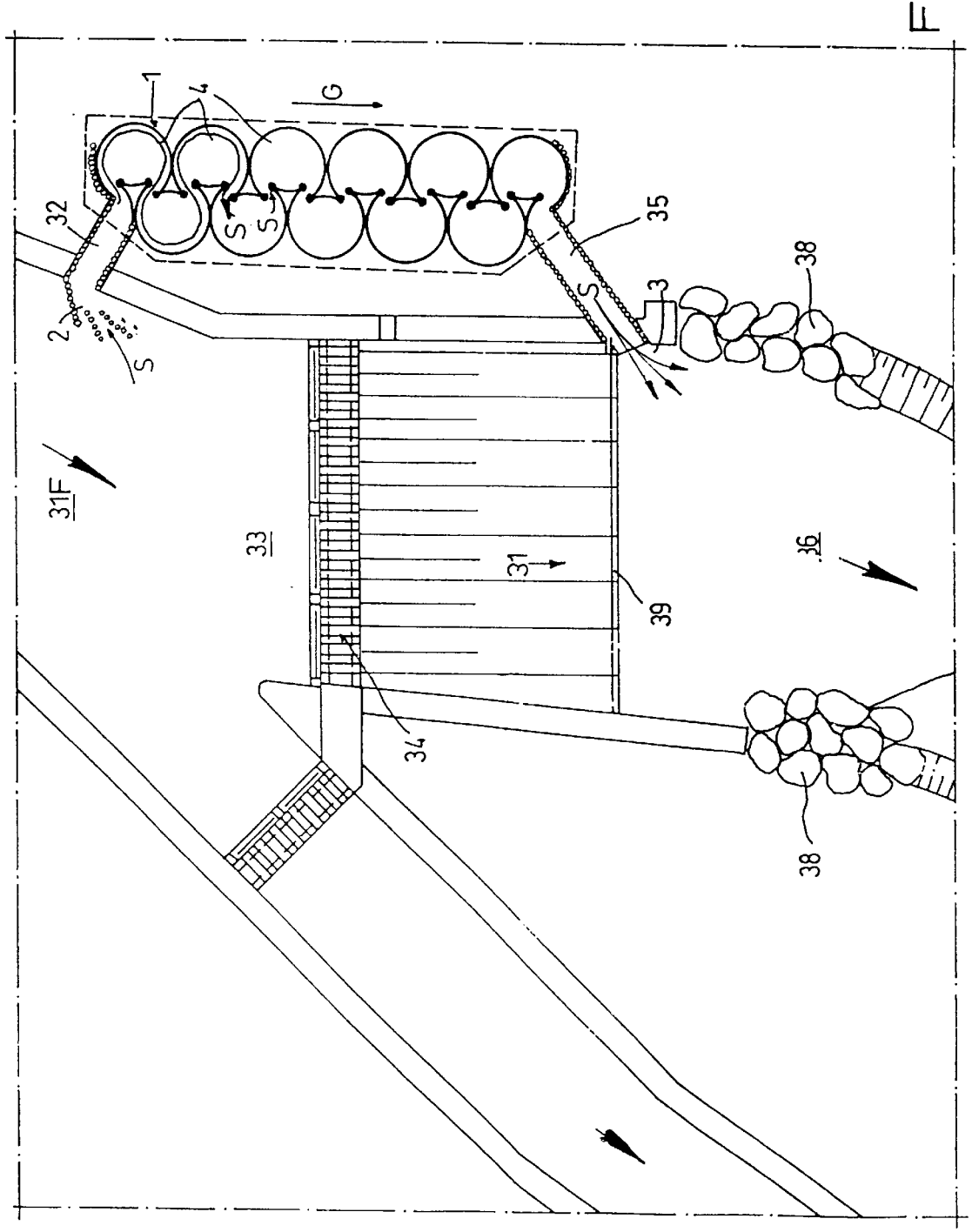

ns with round basins (the so-called round-basin passes) are furthermore known from a technical essay ("Wasser & Boden 47, (1995) 3, p. 55 ff"), in which the round basins either have alternating pairs of cut-outs in the crest and base in the direction of the slope, or through-flow slots. These openings have sharp edges that result in the above shortcomings, such as a detachment of the steady flow and the formation of turbulent flows. The flow does not run parallel to the base of the basin but is directed upward so that the fish who are migrating upstream are receiving the message to swim towards the water surface instead of remaining oriented towards the bottom.

FISH LADDER AND ITS CONSTRUCTION

BACKGROUND OF THE INVENTION

1. Technical Field of the Invention

The present invention relates to a fishway to bypass a vertical descent in a flowing watercourse with an upstream water inlet and a downstream water outlet and with basins arranged between them substantially in a downstream direction, each of which has an inflow slot and an outflow slot as vertical through-flow slots and deflection means to form a meandering passage.

2. Prior Art

Fishways, particularly fish passes and fish ladders, enable migrating salmonidae and small biocenoses to bypass dams, thereby restoring the passableness of bodies of water.

From U.S. Pat. No. 132 349, a fishway according to the preamble is known, which is made of substantially rectangular basins arranged on a sloped ramp with deflection walls formed inside the basins. To create a meandering passage, the through-flow slots in the individual basins are provided alternately in opposite deflection walls and in the cross walls that separate the individual basins. This design has the disadvantage that the basin walls have sharp edges in the areas of the through-flow slots, which cause the steady flow to be disrupted at these locations, so that the fish who are migrating upstream become disoriented and get diverted to the water surface by the turbulent flows and secondary flows and potential change in the curvature path of the water flow in the area of the through-flow slot. The fish are not oriented towards the bottom when they migrate upstream, and they depart from the flow rate of the flow profile that is ideal for their particular species.

Furthermore, dead spaces form in the corners of the basins, in which disadvantageous deposits of detritus accumulate that result in colmations and cause a considerable amount of maintenance work.

Since the ramp has an almost smooth surface, the dam in a flowing watercourse represents an unsurmountable obstacle for small fish and benthic organisms despite the fishway, because the flow rate near the bottom is too high.

In a technical essay ("Wasserwirtschaft 79 (1989) 2, page 67") a fishway—the so-called vertical-slot pass—is described, which consists of rectangular basins, which are arranged successively in the direction of the through-flow and whose cross walls have vertical through-flow slots. The through-flow slots are all formed adjacent to the same longitudinal side of the system, which causes a highly irregular flow pattern (see FIG. 4b, page 68). Turbulent flows, which have a disorienting effect on the fish, are present both in the inlet area into the basins and in the outlet area from the basins.

Because of their shape, the basins in the vertical-slot pass also have dead spaces where material is deposited, which can only be removed with complicated, time-consuming cleaning efforts.

To allow smaller fish to migrate upstream, the vertical-slot pass has a basin floor with a rough texture, which reduces the flow rate in the bottom area.

Practice has shown, however, that loose stones get stuck in the through-flow slots and block the passage, with the result that the creatures are impeded in their migration upstream.

It is true that the vertical-slot pass is an improvement over conventional fishways such as rhomboid passes, or the like regarding the passableness for migrating salmonidae and benthic organisms. However, it is not an ideal system under fluidics aspects since a basin shape with corners not only furthers the formation of dead spaces but also the development of turbulent secondary flows, which are augmented further by sharp edges in the area of the through-flow slots.

Various fishways with round basins (the so-called round-basin passes) are furthermore known from a technical essay ("Wasser & Boden 47, (1995) 3, p. 55 ff"), in which the round basins either have alternating pairs of cut-outs in the crest and base in the direction of the slope, or through-flow slots. These openings have sharp edges that result in the above shortcomings, such as a detachment of the steady flow and the formation of turbulent flows. The flow does not run parallel to the base of the basin but is directed upward so that the fish who are migrating upstream are receiving the message to swim towards the water surface instead of remaining oriented towards the bottom.

The alternating orientation of the openings in the direction of the slope results in the formation of an undulating main flow in the sequentially traversed basins, whereby this main flow runs continuously in the direction of the slope and accordingly flows very fast, at times exceeding the critical flow rates for small fish. To alleviate this problem, the slope is reduced to approximately 10% which, however, entails a disadvantageous increase in the number of required basins.

In the case of basins with a through-flow slot, the steel elements making up the basin must be stabilized in the area of the through-flow slot with welded-in cross struts. This has the disadvantage that the flow is divided and disorienting vortexes are created.

Round-basin passes must therefore be assembled on-site, which is both time consuming and expensive.

Generally known are fishways whose rectangular basins have cut-outs in the crest and holes for the creatures to slip through. Practice has shown that many of these systems are not functional. The cause lies in design errors and in the labor-intensive maintenance of these systems. A further shortcoming lies in the fact that systems of this type only permit the passage of certain species of fish, as the maximum velocities for certain species of fish are exceeded at the slip-though holes. Small creatures cannot pass fish passes of this type. The basin passes with slip-through holes and crest cut-outs require a considerable amount of maintenance since the slip-through holes and crest cut-outs become clogged with flotsam, or the basins become filled with mud which, in the worst case, can make them impassable. The natural self-cleaning effect of these types of systems greatly depends on the flow rate and amount of water. The operability of this fishway is not guaranteed at low water levels as these systems require a great amount of water.

The problem of the passableness of flowing watercourses has also been addressed with an artificial creek, which is designed based on a natural creek and leads around the dam. This solution requires significant amounts of available space and water. Also, accompanying landscaping measures need to be carried out after the construction phase, resulting in considerable expenditures.

OBJECT OF THE SUMMARY OF THE INVENTION

The present invention furthermore relates to a fishway to bypass a vertical descent created by a masonry dam of a catchment reservoir.

To make a catchment reservoir passable for fish, bypasses are known which connect the reservoir area above the masonry dam with the downstream region below the barrage dam, with the bypasses being installed in the underground rock with a complex, expensive tunneling technology. Since these bypasses follow the natural slope of the flowing water that is to be dammed up, the distance to be covered is accordingly long and renders these fish passes very expensive.

Based on the prior art, it is the object of the invention to improve a fishway of the above type to present a compact, cost-effective, nearly maintenance-free passage to allow migrating salmonidae and benthic organisms, regardless of their species, to easily and safely bypass a vertical descent created by a dam.

A second object of the invention consists of disclosing a fishway with which migrating salmonidae and benthic organisms can safely and easily bypass a very large vertical descent, for example in a catchment reservoir, without resulting in great expenditures and complex installation.

It is furthermore a construction-related object of the invention to reveal a process for constructing partially cylindrical basins in a fishway, which is characterized by low costs, a manufacturing process with low labor content and nearly waste-free production.

This object is accomplished in accordance with the invention with the characteristics of claim 1. Additional advantageous designs of the fishway according to the invention are described in the sub-claims 2 through 23.

To create a meandering passage, the fishway according to the invention has partially cylindrical basins arranged behind one another in the direction of the slope, i.e., in the direction of the gradient, in such a way that the successive basins are horizontally and vertically offset from one another. Every second basin has the same orientation, so that all openings of the basins are directed towards a center line extending in the longitudinal direction of the fishway. As the water flows through the successive basins, the flow keeps altering its curvature path, with basins of the same orientation having the same curvature path.

An individual basin consists of two opposite basin walls separated by vertical throughflow slots, with an upstream through-flow slot as an inflow slot into the basin and a downstream through-flow slot as an outflow slot from the basin. The major portion of the inner basin wall is formed by a first basin wall made of a partially cylindrical piece of pipe with a central angle of 180 to 350° and, accordingly, an opening sector with an opening angle of 180° to 10°. The opposite segment forming a second basin wall is shorter than the diameter of the basin and is arranged within the opening sector, or the resulting hollow space, of the first basin wall. At the same time this segment also represents a connection piece for the adjoining edges of the basins immediately upstream and downstream with a different orientation.

The center points of the basins with the same orientation are located on an imaginary straight line extending in the direction of the slope. The basins preferably have base areas of identical sizes, so that the center points of adjacent basins are located at the same distance from each other. To construct a fishway along a sharp bend, the installed basins preferably have different sizes and diameters.

The through-flow slots each run transversely to the direction of the slope. The position of the through-flow slots depends on the base area of the basins; for example in semi-cylindrical basins, the through-flow slots may be located at a right angle to the slope or, in basins with an opening angle of less than 180°, the through-flow slots may be located at an oblique angle to the direction of slope. This advantageously results in a meandering passage, which rises against the slope in an inlet or outlet area from the basins, from which inlet or outlet area the flow passes along the inner wall of the basin, thus creating a self-cleaning effect in the basins. This has the advantage that the fishway according to the invention does not become filled with detritus and the required cleaning and maintenance efforts are relatively minor. Also, no dead spaces exist, which enhances the natural cleaning effect of the flow. Since no detritus is deposited in the basins and no turbulent flows occur, the fish do not become disoriented during their migration upstream.

The partially cylindrical shape of the basins and the arrangement of the through-flow slots furthermore have the result that the flow is directed tangentially into the respective basin. As a result, a laminar flow is created as an attraction flow for creatures who want to migrate upstream so that they can easily and safely bypass the vertical descent.

Furthermore, the flow also does not get disrupted in the area of the through-flow slots and does not become detached from the inner walls of the basins, and all in all a low-turbulence flow pattern results. Accordingly, the design of the basins is physiologically optimally adapted to the natural life-style of the fish as no confusing turbulent flows prevail in the fishway but the fish who wants to migrate upstream is given unambiguous information in the form of the laminar flow.

Due to the design of the fishway according to the invention in the form of a meandering passage with partially cylindrical basins and through-flow slots oriented transversely to the direction of slope, the flow rate within a basin is reduced to almost zero from the basin wall to the center of the basin. This has the advantage that a resting zone is formed in the vicinity of the basin center, where the fish and small creatures can linger during their migration. In this manner all benthic organisms and migrating salmonidae can migrate upstream in the area of the flow that is ideal for them. Compared to the flow pattern in the known systems, the meandering flow pattern in the fishway according to the invention is characterized by a laminar profile.

The width of the through-flow slots is at least 30 mm, preferably at least 45 mm, rendering the migration upstream in the vicinity of the bottom of the fishway safe for both small fish and large salmonidae, and independent from the water levels in the basins. The through-flow slots are furthermore bounded by a flow-directing deflection means along the entire height of the basins. A first flow-directing deflection means is a vertical, partially cylindrical pipe with a radius significantly smaller than that of the inner basin walls.

Besides a decrease in the flow rate toward the center of the basin, the flow rate also decreases with an increasing height of the basins, thus permitting the fish to migrate through the fishway at different elevations.

In a preferred design of the fishway according to the invention, a second, shorter partially cylindrical pipe is arranged over the first partially cylindrical pipe, resulting in a change of the cross section above the height of the through-flow slot. The interior diameter of this second pipe is somewhat larger than the exterior diameter of the pipe immediately underneath.

These pipes, which serve to round off the edges between successive basin walls, are deflection means; two additional, partially cylindrical pipes of different lengths are preferably slipped over the first pipe as deflection means, with the lowermost pipe having the largest diameter and the shortest length, so that the cross section of the through-flow slots decreases from the water surface to the bottom of the basin.

The cross section then has three steps, and as a result the rate of flow is nearly constant, except for an area near the bottom inside the through-flow slot, and the vertical flow pattern has several corridors. Inside the corridors the flow is augmented and a tunnel effect results, so that the fish migrate upstream in the area of the flow rate that is best for them. The maximum flow rates for the fish species are not exceeded.

It is advantageous to provide a counter-berm in the outlet area from the basins, particularly in basins whose bottom surface is larger than the area of a semicircle. These counter berms preferably rise at the same value as the slope descends. This results in the formation of a flow inside the basins that runs parallel to the bottom of the basin regardless of its location. This has the advantage that bottom-dwelling fish are not misguided to the surface by a detachment of the flow from the bottom.

It is particularly advantageous if the basin floors have a rough texture to create a pattern of gaps that also allows benthic organisms to migrate upstream while staying close to the bottom. In a preferred design, an amorphous, wide-meshed mat with interconnected hollow spaces is secured to the basin floor with the aid of cement. The use of a mat has advantages with respect to the construction process, and also eliminates the problem of clogged through-flow slots due to deposited stones, waste, driftwood, etc. This keeps the required amount of maintenance to a minimum, which, in turn, is reflected positively in low operating costs. Alternatively, sediments may be used to create the texture of the basin floor.

A rough basin floor causes a reduction in the flow rate in the area near the bottom, so that small fish can migrate upstream as well. The gap pattern with its hollow spaces, slits and crevices also allows small creatures to bypass the vertical descent created by the dam.

In a first embodiment, the basins have an area of a semicircle as their base and the pipe section has a center angle of 180°, and the opposite segment forming the second basin wall is arranged on the diameter of the semicircle. These segments are preferably slabs whose longitudinal dimensions are smaller than the diameter of the semi-cylindrical pipe section. The design of the fishway that is manufactured from these semi-cylindrical basins is particularly cost-effective and the individual parts needed to construct the fishway come pre-assembled.

In a second embodiment, the basin has a base that is larger than the area of a semicircle. The basin walls consist of a pipe section with a center angle of preferably 300° so that the opening between the edges of this first basin wall has an opening angle of 60°. The opposite second basin wall is formed by another pipe section which is inserted with an exact fit between the adjacent edges of the basin walls immediately above and below, and the second basin wall consequently represents a connection piece between first basin walls with the same orientation. For the creation of a single basin, the second basin wall is preferably arranged on a chord forming the circular arc of the first basin wall, so that the area of the segment of a circle forming the base of the basin is larger than the area of a semicircle. The design of the fishway made with these cylinder-section basins results in a fluidically ideal meandering passage. The flow is low in turbulence. This design of the basins furthermore has the advantage that no waste is generated during the manufacture of the basins. Also, the individual pieces can be preassembled for the construction of the fishway.

A third design is characterized by a very compact arrangement of the basins. Like in the second embodiment, the individual components used to construct the fishway according to the invention consists of a first pipe section with an opening angle of preferably 10 to 20° as a first basin wall, alternating with a second pipe section in the shape of a pipe sector as the second basin wall. The two individual components of the system are arranged inside one another, offset from one another, so that partial basins with nearly identical areas and elliptical cross section are created within a basin, along with constrictions as through-flow slots between the deflection means and the opposite inner basin walls.

To generate a meandering flow, a partially cylindrical pipe section is provided behind the constrictions as a second deflection means. These bulges along the inner basin walls in the area of the inlet behind the constriction into the lowermost of the three partial basins, have the effect that the flow in this area is detached from the basin wall and flows into the next partial basin along a meandering pattern, without impacting head-on into the wall of this basin.

This third embodiment of the fishway according to the invention is particularly suitable for applications in catchment reservoirs where the length of the available path is limited.

The fishway according to the invention is characterized by a comparatively small amount of required water as compared to conventional fish ladders, and the flow conditions remain unvaryingly good even during major water level fluctuations in the upstream area of the flowing watercourse.

Fish must be guided into and through the fishways by attraction waters. An optimal attraction flow is attained by the acute angle of the downstream outlet from the fishway into the flowing watercourse. An attenuation of the attraction flow can be attained by means of a guiding and flow organ, which extends perpendicular to the water flow between the river banks that bound the flowing watercourse on each side, and serves to guide run-off water from the dam to the downstream discharge trench of the fishway.

The guiding and deflection means preferably consists of a larch-wood board whose dimensions are adapted to the body of water and which preferably has a cross sectional area of 6×12 cm, which is installed at the base of the dam. This guiding and deflection means at the base of the flood gate serves to additionally direct the residual water from the gates that let some water through into the lowermost basin of the fishway to augment the attraction flow at the entrance to this basin, and to prevent the formation of "secondary attraction flows".

In addition—depending on the individual situation—it may be advantageous to have a fish guiding rake, which is guided transversely to the run-off surface flow, e.g., behind a turbine system from river bank to river bank, vertically down into the sediments.

The fishway according to the invention is connected, as one construction unit, to the flowing watercourse via laterally secured connection trenches, with an upstream connection trench leading to the upstream reservoir area above the dam and a downstream connection trench leading to the downstream discharge area below the dam. The upstream connection trench preferably has a sturdy flap made of a fiber cement slab at its inlet, which extends downward to the sediments of the reservoir area. The flap is open against the flow direction of the dammed up water. This design allows the returning eels to find the fish pass and they can migrate unimpededly in the direction of the sea (Sargasso Sea spawning grounds). This makes the invention particularly suitable as a so-called eel slide.

The simple construction of the fishway furthermore makes it cost-effective. Particularly cost-effective is a construction with pre-assembled units, in which the basins are pre-mounted on a pre-assembled steel scaffold, preferably hot galvanized, with glued-in floor slabs and cemented-in mats. A pre-assembled piece part is formed by several adjacent pipe sections of the same orientation with shorter sections between them. The number of the basins that are pre-assembled on the prefabricated part depends on the total number of basins in the fishway, however, preferably three to four basins of the same orientation are arranged successively to facilitate transportation and provide for an easy final assembly on-site. This is another positive aspect of the basins having the shape of a segment of a circle, as the modules can be inserted into one another for transportation purposes.

During the on-site assembly, depending on the individual requirements, either the preassembled version consisting of pre-manufactured individual components that are mounted on a steel ladder scaffold is installed with pre-fabricated separate concrete foundations along the course of the existing slope and connected to the reservoir area and the downstream region as described, or the basins are mounted onto a sloped concrete slab (ramp) that is constructed onsite and sealed with a special cement. All connecting points and gaps are grouted in with aluminous cement. Externally, the prefabricated parts are provided with a sloped cement grouting to protect them from shifting. An additional seal can be provided if a special cement is used for this purpose. The basins are connected to one another with stainless-steel bolts and neoprene sealing disks. Slip-on deflection means forming the through-flow slots on the edges of the basin walls are pre-manufactured from fiber cement pipes. They are secured to the basin ends of the basin walls by means of stainless-steel screws and grouted in with aluminous cement mortar. The head ends are additionally rounded off The slope or incline of the fishway is determined by the height offset of the basins of maximally 25 cm, and by the individual basin diameters. The ability of the migrating species to climb or swim through the partial meanders (first design) or full meanders (second and third design) of the basins needs to be taken into consideration as appropriate.

To summarize in conclusion, the fishway according to the invention is very well suited to meet the fluidics requirements for the prevention of turbulences and for the formation of an attraction flow by means of a local augmentation of the water volume in the discharge areas.

The system according to the invention is furthermore characterized by a particularly simple construction and the option to construct by pre-assembled units.

The second object is accomplished according to the invention with the characteristics of patent claim 25, with the sub-claims 26 through 32 presenting further advantageous designs of the fishway according to the invention.

The fishway according to the invention for bypassing a vertical descent in a catchment reservoir created by a masonry dam consists of several portions. One fishway, preferably the compact version with the third of the above basin shapes, is provided both in an upstream portion of the system on the reservoir side and in a downstream portion of the system on the air space side. To form a meandering passage, the portions have a plurality of consecutive basins with partially cylindrical inner basin walls, with constrictions as through-flow slots. Both portions are connected via a connection channel that passes through the masonry dam. To enable the fish and benthic organisms to migrate through the fishway regardless of the water level in the reservoir area, the basins in the upstream portion have an opening at the bottom. This opening can be controlled via a slide, independently from the water level in the catchment reservoir.

The slope in the fishway may be up to 30%.

In addition to the actual passage system, the fishway advantageously comprises an inverted-siphon system. The inverted-siphon system consists of an upstream vertical siphon tube on the reservoir side and a downstream vertical siphon tube on the air space side, which are connected by a siphon channel that extends horizontally through the masonry dam. The downstream siphon tube is connected to the downstream portion of the fishway via at least one distribution channel. Both siphon tubes have openings that can be closed via slides to equalize the water level. This design permits the equalization of the pressure or water level between the catchment reservoir and a basin of the downstream system portion which is arranged on the same height end of the upstream siphon tube.

The inverted-siphon system advantageously reduces the number of basins in the upstream portion of the system. This fishway is a very compact short-distance system.

Since no expensive earthwork, such as tunnel constructions, etc. is required to complete the fishway, this fishway, while providing at least the same effectiveness, is considerably less expensive than the tunneling method.

The construction-related object is achieved according to the invention with the characteristics of claim 33; the sub-claims 34 through 42 present additional advantageous variations of the construction process according to the invention.

A pipe, specifically commercially available pipes of cement, glass-fiber cement or other materials, is divided into a plurality of identical pipe sections through cross cuts at a right angle to the pipe axis alternating with cuts at a cutting angle to the pipe axis that is determined by the slope of the fishway. From each of these pipe sections at least one pipe sector is cut out through coaxial cuts extending parallel to the pipe axis, so that a partially cylindrical basin wall is obtained with an opening angle of 180 to 20°, depending on the basin type.

With basin types of semi-cylinders, the cut-out pipe sector is also a semi-cylinder, so that advantageously no waste is generated. If smaller pipe sectors with a center angle of less than 180° are manufactured, the left-over pieces also are not discarded as waste, but instead used as a section forming a second, shorter basin wall in the direction of the slope, between consecutive adjacent basins of the same orientation. It may be necessary to reduce the size of the section with an additional coaxial cut parallel to the longitudinal axis.

With the process according to the invention the individual components of the fishway may be pre-assembled off-site, so that the on-site installation can be performed quickly and easily. As a result, the investment costs will be low.

BRIEF DESCRIPTION OF THE DRAWINGS

The fishway is explained in more detail based on the FIGS. 1 through 15, with FIGS. 1 through 4 and 8 through 10 showing different preferred embodiments of the fishway. FIGS. 5 through 7 show a connection of the fishway to a flowing watercourse that is dammed by a weir.

FIG. 2 shows a longitudinal section through the fishway of FIG. 1, FIG. 3 shows a top view of a fishway with nearly cylindrical basins with one opening (second embodiment), FIG. 4 shows a longitudinal section through the fishway of FIG. 3, FIG. 5 shows a schematic top view of a fishway according to FIG. 1 integrated into a flowing watercourse as a bypass around a dam, FIG. 6 shows a schematic top view of a fishway according to FIG. 3 integrated into a flowing watercourse as a bypass around a bulkhead weir, FIG. 7 shows a schematic top view of a fishway according to FIG. 3 integrated into a flowing watercourse as a bypass around a side weir, FIG. 11 shows a schematic top view of a fishway according to FIG. 3 with an upstream and a downstream portion, and a connection channel between the two portions to bypass a vertical descent created by a masonry dam in a catchment reservoir, FIG. 12 shows a longitudinal section through the fishway according to FIG. 11, FIG. 13 shows a schematic top view of a fishway according to FIG. 10 with an upstream and a downstream portion and a connection channel between the two portions to bypass a vertical descent in a catchment reservoir created by a masonry dam, and an inverted-siphon system, FIG. 14 shows a longitudinal section through the fishway according to FIG. 13, FIG. 15 shows a vertical view of the fishway according to FIG. 13.

DETAILED DESCRIPTION OF THE PREFERRED EMBODIMENT(S) OF THE INVENTION

Figure 1:
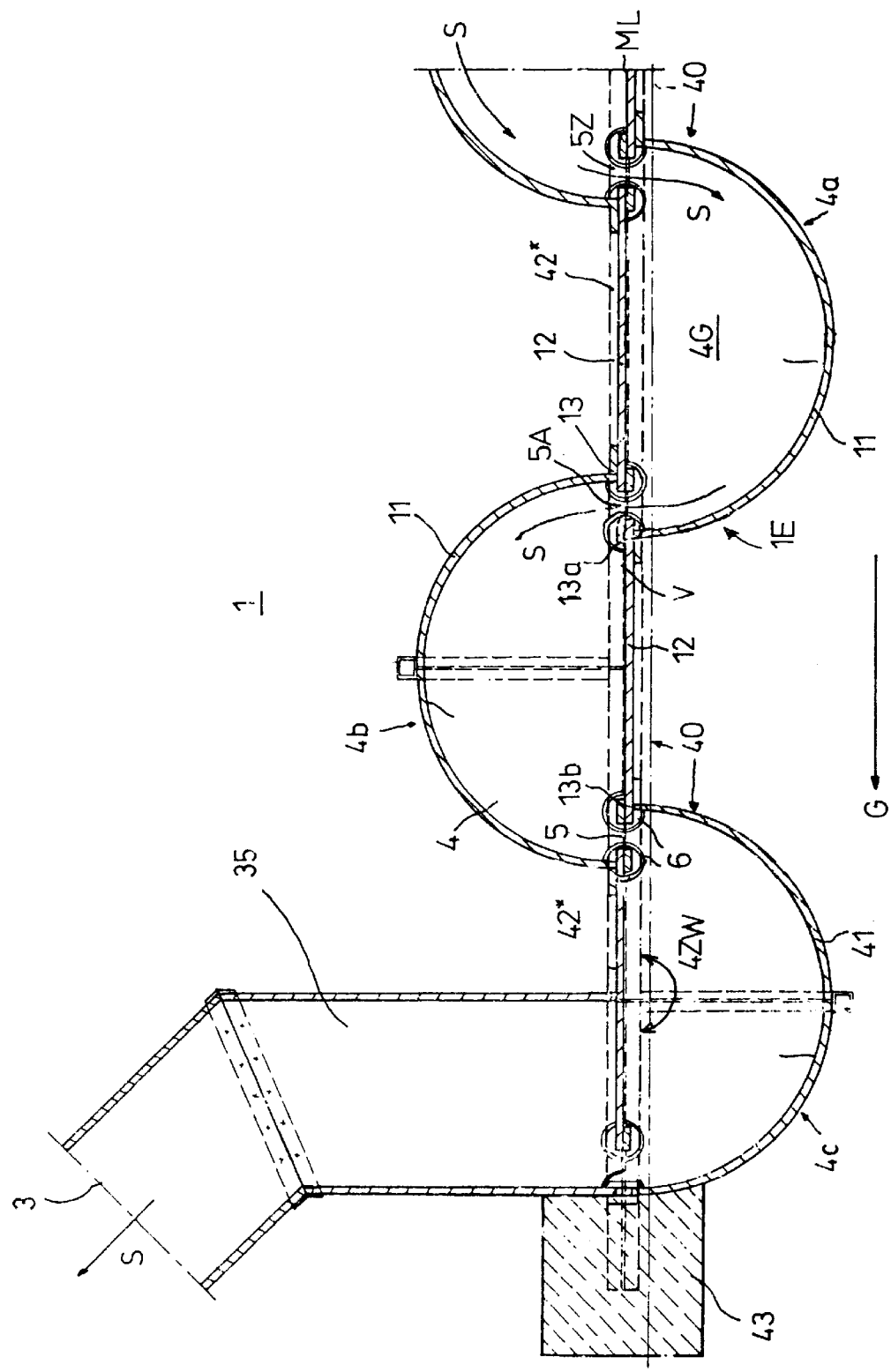
FIG. 1 shows a top view of a water outlet from a fishway with semi-cylindrical basins (first embodiment)

The fishway (1) according to the invention with consecutive partially cylindrical basins (4) arranged along an existing direction of slope (G) with through-flow slots (5) form a stair-like bypass around a dam (34) in a flowing watercourse (31F), for example a bulkhead weir, side weir or the like. The fishway (1) extends nearly parallel to the flowing watercourse (31F) and is integrated as a compact construction unit alongside the dam (34), with an upstream connection trench (32) as an upstream water inlet (2) into the fish ladder (1) connecting the reservoir area (33) to the uppermost basin, and a downstream connection trench (35) as a downstream water outlet (3) from the fish ladder (1) connecting the lowermost basin to the downstream region.

Via the water inlet (2) the basins (4) are supplied with water from the reservoir area (33). After the water has passed through the basins (4) it exits the fishway (1) via the down-stream water outlet (3) into the downstream region (36) of the flowing watercourse (31). After leaving the flow (S) from the downstream connection trench (35) or the lowermost basin, a laminar attraction flow with a very high flow rate forms while entering the downstream region (36), which shows the fish who want to migrate upstream the way into the fishway (1).

The diameter (d1) of the basins (4) depends on the local conditions, such as the vertical descent, length of the path or available space. However, financial and construction-related aspects, for example regarding the use of commercially available pipes, also factor into the determination of certain diameters (d1). The diameter (d1) of the basins (4) is between 0.8 to 5 m, preferably between 1 and 3 m; basins with larger diameters (d1) are needed to attain very compact designs, which are required for fishways that are integrated into catchment reservoirs (31T).—FIG. 10—.

The diameter (d1), which influences the flow rate, must be selected so that the maximum flow velocities, which depend on the respective fish species, are not exceeded.

A height difference (height of fall) between successive basins (4, 4a, 4b, 4c, 4d) is between 10 and 25 cm, preferably 15 cm, in the case of systems that are installed in flowing watercourses (31F), and 25 cm in systems (1) that are installed in catchment reservoirs (31T), since this ensures that the maximum flow rate of 1.10 m/sec is not exceeded in the bottom area. The selected height of fall depends on the species of migrating salmonidae that are present in the respective region.

The incline or slope (G) of the fishway (1) is determined by the height difference (height of fall) and the diameter (d1) of the basins (4). The climbing or swimming ability of the migrating creatures, such as migrating salmonidae and benthic organisms, must be taken into consideration depending on the local conditions. A good compromise between the construction length of the fishway (1) and the maximum flow rate is attained at a relative slope (G) of around 20%; in individual cases the slope (G) is more gradual, however, not less than 14% or above. In the case of very high vertical descents and limited available space, for example in catchment reservoirs (31T), the slope (G) may be up to 30%.

The height of the basins (4) depends on the shorter surface line of the surface lines located in the plane of symmetry (SE) of the basin (4), which surface line has a length of at least 70 cm.

The fishway (1) according to the invention enables migrating salmonidae and benthic organisms to bypass the vertical descent (SH) created by the dam (34) during their daily change of location or seasonal migration.

The fishway (1) comprises a plurality of basins (4) with identical base area (4G), whose vertical through-flow slots (5) each form an inflow slot (5Z) and an outflow slot (5A).

Within the fishway (1), successive basins (4a, 4b, 4c, 4d) are oriented against one another to form a meandering passage, and offset laterally so that the through-flow slots (5) run transversely to the direction of slope (G). The flow (S) then changes its curvature path (SD) each time as it flows through the successive basins (4) and passes tangentially along the inner basin wall (40) in the inlet or outlet area (4EB, 4AB) of each basin. A meandering flow (S) forms, with sections that partially rise against the slope (G) in the outlet area (4AB) from the basin (4).

The basins (4) that have the same curvature path (SD) form two separate piece parts (1E), which are separated by the through-flow slots (5) and represent the longitudinal sides of the fishway (1).

Each individual basin (4) consists of a plurality of basin walls (11, 12), with a first basin wall (11) comprising of a randomly formed partially cylindrical pipe section (41, 41*) and a second basin wall (12) located opposite the first basin wall (11) consisting of a segment (42, 42*), which connects adjacent edges (13a, 13b) of pipe sections (41, 41*) located immediately above and below. The two basin walls (11, 12) are separated by an inflow slot (4Z) and an outflow slot (4A). Each basin (4) forms an element on one of the piece parts (1E) in the fishway (1), so that the piece parts (1E), depending on the number of basins (4) each comprise an alternating sequence of a pipe section (41, 41*) and a connection piece (42, 42*). The basin walls (40) preferably comprise pre-constructed units of fiber cement or glass-fiber cement.

In the assembled condition, the adjoining edges (13a) of the basin walls (40) are encompassed vertically by a first partially cylindrical pipe (60) as a first deflection means (6) with significantly smaller radius relative to the radius of the inner basin walls (40), so that the through-flow slots (5) are bounded along the entire height of the basin. This prevents the flow (S) from being disrupted, especially in the outlet area (4AB) of the basins (4), and the through-flow slots (5) are bounded in a manner which controls the flow. The width of the through-flow slots (5) is at least 30 mm, preferably at least 45 mm, so that the fish do not get stuck in the through-flow slot (5).

Figure 8:
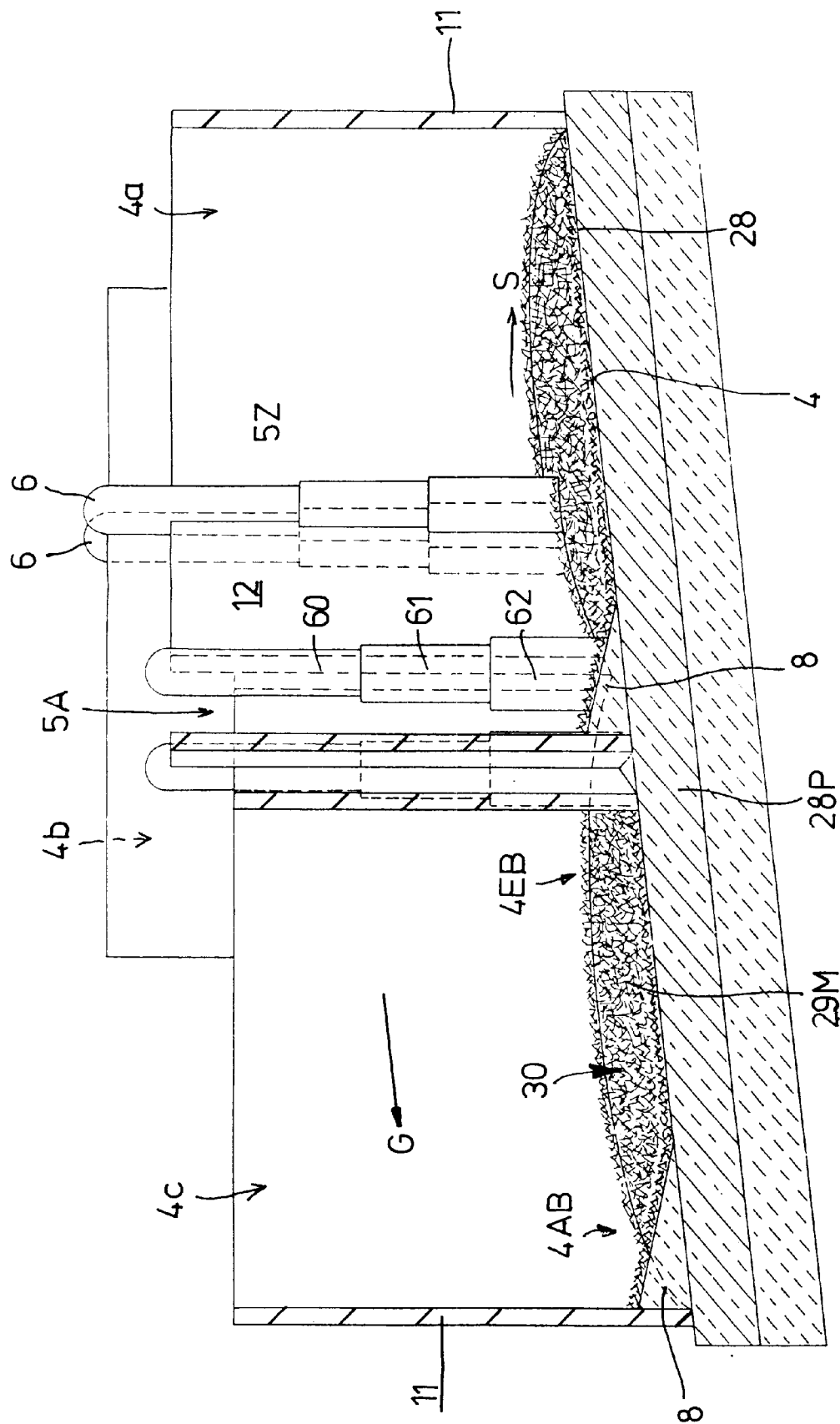
FIG. 8 shows a longitudinal section through a basin with counter-berm and a mat along the floor.

The floor (28) of the basin has a rough texture to keep the flow rate low in the area near the bottom and allow small fish and benthic organisms to migrate upstream in the basins (4). To form a gap system, sediments (29S) of either fist size or child's head size are provided in/on the basin floor (28)—FIG. 2—or the basin floor (28) is covered with an amorphous, wide-meshed mat (29M) in the form of a fleece with interconnected hollow spaces—FIG. 8—. The continuous transition between the individual basins (4) enables all creatures to migrate through the system.

FIGS. 1 and 2 show a first embodiment of the fishway (1) with basins (4) whose base areas (4G) are formed in the shape of a semicircle.

The pipe section (41) forming the first basin wall (11) has a center angle (4ZW) of 180° and the connection piece (42T) forming the second basin wall (12) is a slab (42), whose length is shorter than the diameter (d1) of the semicircle or of the basin (4). To form a basin (4), the slab (42) is arranged on the diameter of the line forming the semicircle, i.e., in the opening between the edges (13) of the first basin wall (12). The remaining distance to the adjacent inner basin wall forms the inflow slot and an outflow slot (5Z, 5A).

The center points of the diameter (dl) of the semicircle are located on an imaginary straight line (G1) extending in the direction of the slope (G), whereas the center points (MP) of the semi-cylindrical basins (4) are located on a zigzag line (V), so that all through-flow slots (5) are at a right angle to the slope (G) and an inlet and outlet flow (S), which pass tangentially along the inner basin wall, form in the area of the through-flow slots (5).

The fishway (1) comprises two piece parts (1E) consisting of successive, alternating half-pipe sections (41) and slabs (42*). For a final assembly of the fishway (1), the piece parts (IE) that have been prefabricated in the factory are transported to the construction site. Alternatively, the piece parts (1E) may also be assembled on-site in the dry. Afterwards the floor slabs (28P) are glued in and the prefabricated basin system is attached to a hot-galvanized steel ladder scaffolding which is subsequently anchored in the river bank area with separate concrete foundations (43).

This first embodiment is connected to the flowing watercourse (31F) via a downstream connection trench (35) and an upstream connection trench (32) (not shown in the drawing). The connection trenches (32, 35) are fiber-cement channels with rectangular cross sections that are open along the top, each of which connects the respective uppermost and lowermost semi-cylindrical basin (4) to the flowing watercourse (31F). A multi-part construction permits an optimal flexible connection to the flowing watercourse (31F) and the construction principle also permits the construction of angular fishways (1).

FIG. 2 shows a through-flow slot (5) whose cross section changes along its height. The constriction of the cross section reduces the amount of water required for a safe operation of the system (1) and permits a precise adjustment of the water level. To change the cross section, two shorter partially cylindrical pipes (61, 62) with an opening on their longitudinal sides are slipped on, as sleeves (61, 62) on both sides, over the deflection means (6), which bound the through-flow slot (5). These sleeves (61, 62) have a somewhat larger interior diameter—FIG. 9—compared to the exterior diameter of the pipe (60, 61) located immediately below.

Preferably, the through-flow slot (5) is narrowed on the floor side. Preferred graduations of the through-flow widths are 4.5 cm, 6.0 cm and 8.5 cm at a water volume of 60 liters/sec or 8.0 cm, 10.5 and 13.0 cm at a water volume of 600 l/sec. For this purpose the edges (13) of the basins (4) are encompassed by sleeves (60, 61, 62) with decreasing lengths and increasing diameters. Other graduations may, of course, be chosen depending on the requirements.

FIGS. 3 and 4 show the second embodiment of a fishway (1). The basins (4) consist of two pipe sections (41*, 42) of different sizes as a first and second basin wall (11, 12), which are arranged opposite one another to form the segment of a circle as the base area (4G). The first basin wall (11) has a center angle of 300° and the second basin wall (12) has a center angle of 50°. The second basin wall (12) is arranged approximately on the chord of the first basin wall (11).

The illustrated system (1) consists of eleven steps, with the first basin walls (11) oriented with their alternating openings (40) towards the center line (M) of the fishway (1). The center points (MP) of the basins (4a, 4c; 4b, 4d) that have the same orientation are located on two parallel, imaginary straight lines (G1, G2) extending in the direction of the slope (G). The center points (MP) of the successive basins (4a, 4b, 4c, 4d) are located on an imaginary zigzag-shaped connecting line (V) with the resulting angles between the sides all having the same size. The through-flow slots (5) are congruent with the connecting line approximately in the center of a leg.

The basins (4) each form one step since the basin floor (28) does not have an equal slope (G) within a basin (4), but is slanted in the inlet area (4EB) of the slope (G) and rises horizontally or slightly against the slope (G) in the outlet area (4AB) due to a counter-berm (8)—FIG. 4—. The incline of the counter-berm (8) preferably has the approximately same value as the slope (G). The successive basins (4a, 4b, 4c, 4d) form a type of spiral staircase along an inclined plane with a walking line (flow line) broken by more than 1800 in each case, with the head step (water inlet) (2) and entrance step (water outflow) (3) located on the same side of the staircase, i.e., on the side of the steps facing the water.

The basins (4) furthermore have a flow-off channel (22) of fiber cement, for which the second basin wall (12) and the immediately adjacent first basin wall (11) of the subsequent basin (4) each have a semi-circular cut-out (18) at the upstream edge (16) of a common corner (17). The vertex of the cut-out (18) is located approximately 15 cm from the upper edge of the basin (16). The center points of the cut-outs are located on an axis (21) so that a semi-circular shell (22) embedded into aluminous mortar can be inserted into the cut-outs (18). This flow-off channel (22) is flooded during high water and serves as an aid, especially for large salmonidae such as salmon and sea trout, to migrate upstream.

Figure 9:
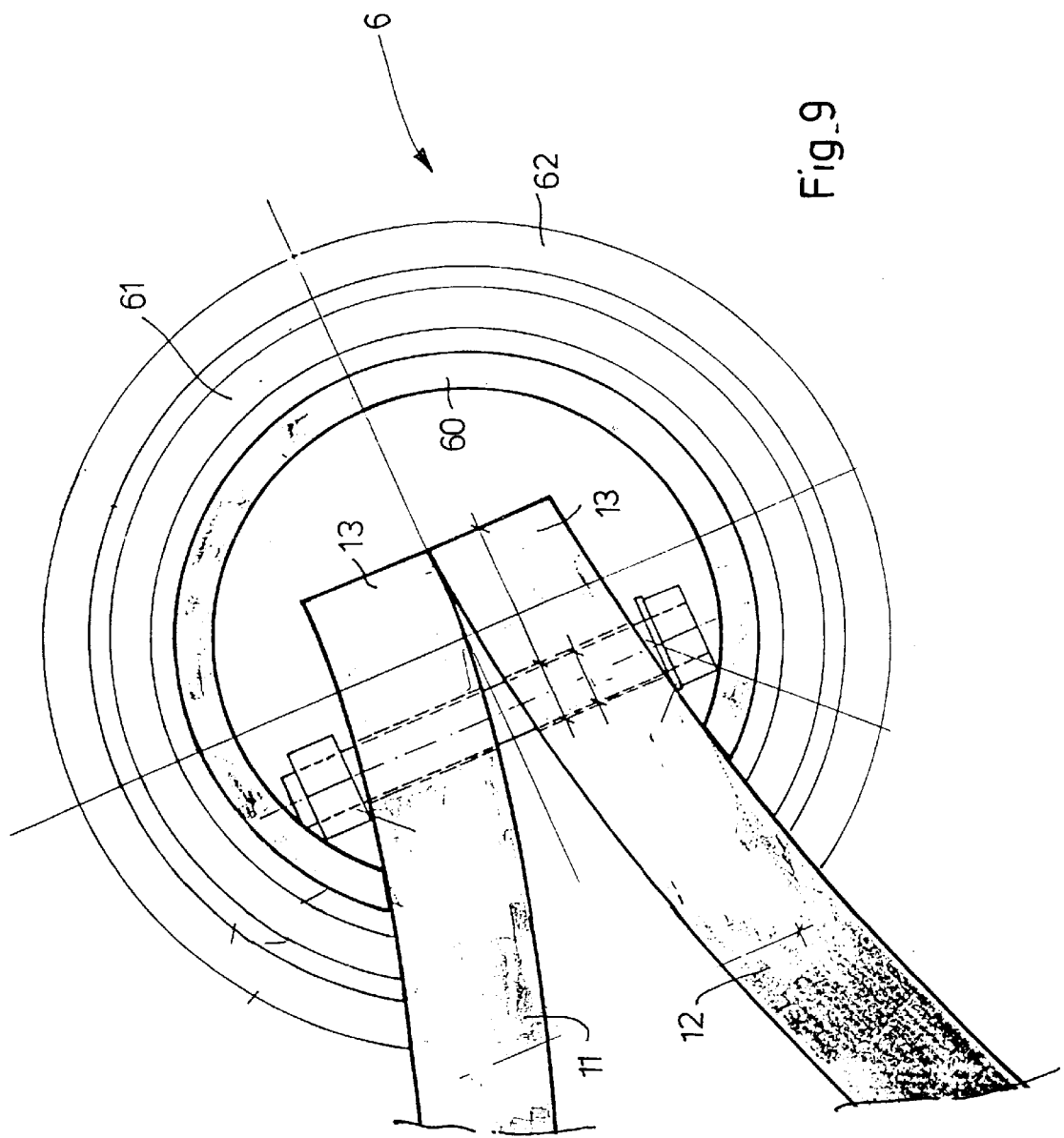
FIG. 9 shows a detailed top view of a connection of two walls of successive basins that are arranged in a longitudinal direction, and a deflection means encompassing the adjoining edges.
Figure 10:
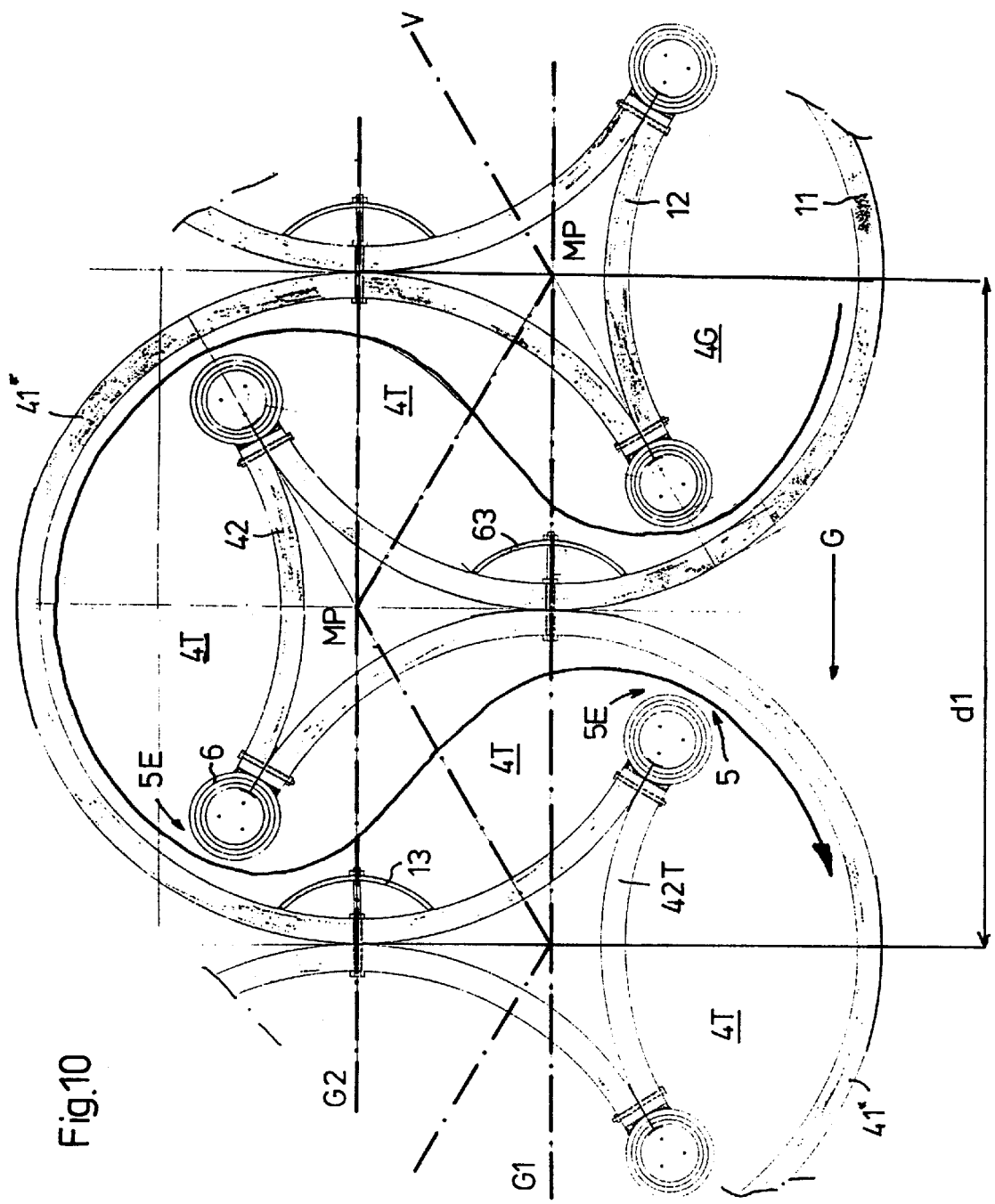
FIG. 10 shows a detailed top view of a portion of a fishway with three elliptical partial basins (per basin) with nearly identical cross sections (third embodiment)

FIG. 4 shows the fishway (1) mounted onto a reinforced concrete slab (54). For its construction, a subbase (56) is excavated along the existing slope (G) in the river bank area near the dam. On the outside, the basins (4) are secured onto the concrete slab (54) with galvanized angles. Seams located on the interior between the basin floor (28) and the basin walls (4) are sealed with a Thiocol joint or floor pavement. For stabilization, the basins (4) are supported on the exterior with a slanted cement footing (55) of a special cement, which at the same time also has a sealing function. The basins (4) are interconnected with stainless steel bolts as shown in FIGS. 9 and 10. At least one partially cylindrical pipe (60, 61, 62) is slipped over each edge (13) of the basin walls (11, 12) as a sleeve (60, 61, 62), which is secured with stainless steel screws. The resulting hollow spaces are grouted in with aluminous cement and the head ends along the top are rounded.

After the assembly, the fishway (1) is integrated, as shown in FIG. 3, into the flowing watercourse (31F) via connection trenches (32, 35) to the upstream reservoir area (33) and to the downstream region (36). These connection trenches (32, 35) are secured by palisades or concrete walls.

Figure 7:
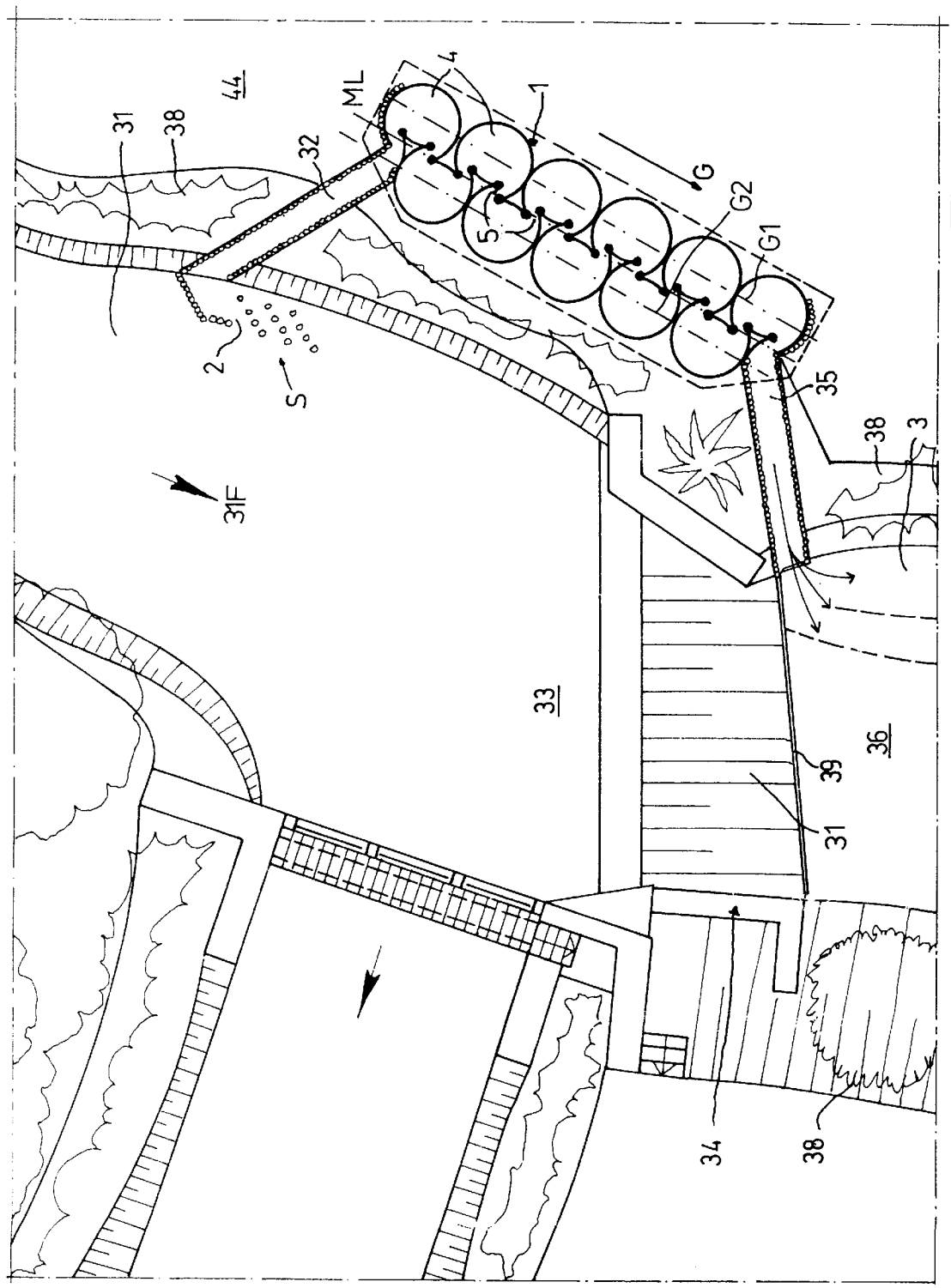

In FIGS. 5 through 7 the integration of a fishway (1) into a flowing watercourse (31) with dam (34) is illustrated schematically.

In the embodiment of FIG. 5, a fishway (1) according to FIGS. 1 and 2 is integrated parallel to a weir (34) in the corresponding river bank area (44), and additional sediments (29) are provided in the water outflow (3) to attenuate an attraction flow (S).

The trickling water (31) overflowing a weir (34) is collected via a guiding and deflection means (39) designed in the form of a channel, and passed, via an adjoining discharge pipe (53), into the lowermost basin (4) of the system (1), thus augmenting the attraction flow at the outlet (3).

The water inflow (2) into the uppermost basin (4) has an adjustable inflow flap (37) or a slide arranged transversely to the flow (S), to regulate the amount of water entering. The flap (37) is preferably controlled in a manner so that the built-up pressure acting on the intake flap (37), which is generated by the flow traversing the dam (34), tightly closes this intake flap (37). Alternatively, a slide may be provided. For maintenance work, the water inlet (2) into the fishway (1) is blocked off completely, so that the fishway (1) is drained.

FIG. 6 shows a bulkhead weir (34) in the flowing watercourse (31F) with a fishway (1) as a bypass according to FIGS. 3 and 4, with the downstream connection trench (35) being arranged at an acute angle to the downstream region (36) to reinforce the attraction flow. The water outflow (3) preferably discharges into the downstream region (36) at an angle of approximately 30° to the respective river bank.

The upstream and downstream connection trenches (32, 35) to the upstream reservoir area (33) and the downstream outlet (36) of the flowing watercourse (31F) are secured by palisades. In the inlet into the upstream connection trench (32), palisade bulkheads are provided to form a tapering funnel in the direction of the flow, and a threshold is provided 30 cm below the water surface to catch any waste and prevent flotsam from being carried into the system (1).

The trickle water (32) flowing off over the bulkhead weir (34) is directed into the downstream connection trench (35) via a guiding and deflection means (39) in the form of a plank of larch wood with a cross section of 6×12 cm at the base of the gate support.

In FIG. 7, an analogous design of the fishway (1) of FIG. 6 is shown, with the flowing watercourse (31F) dammed by a side weir (34) and the downstream connection trench (35) not arranged at an acute angle.

Figure 11:
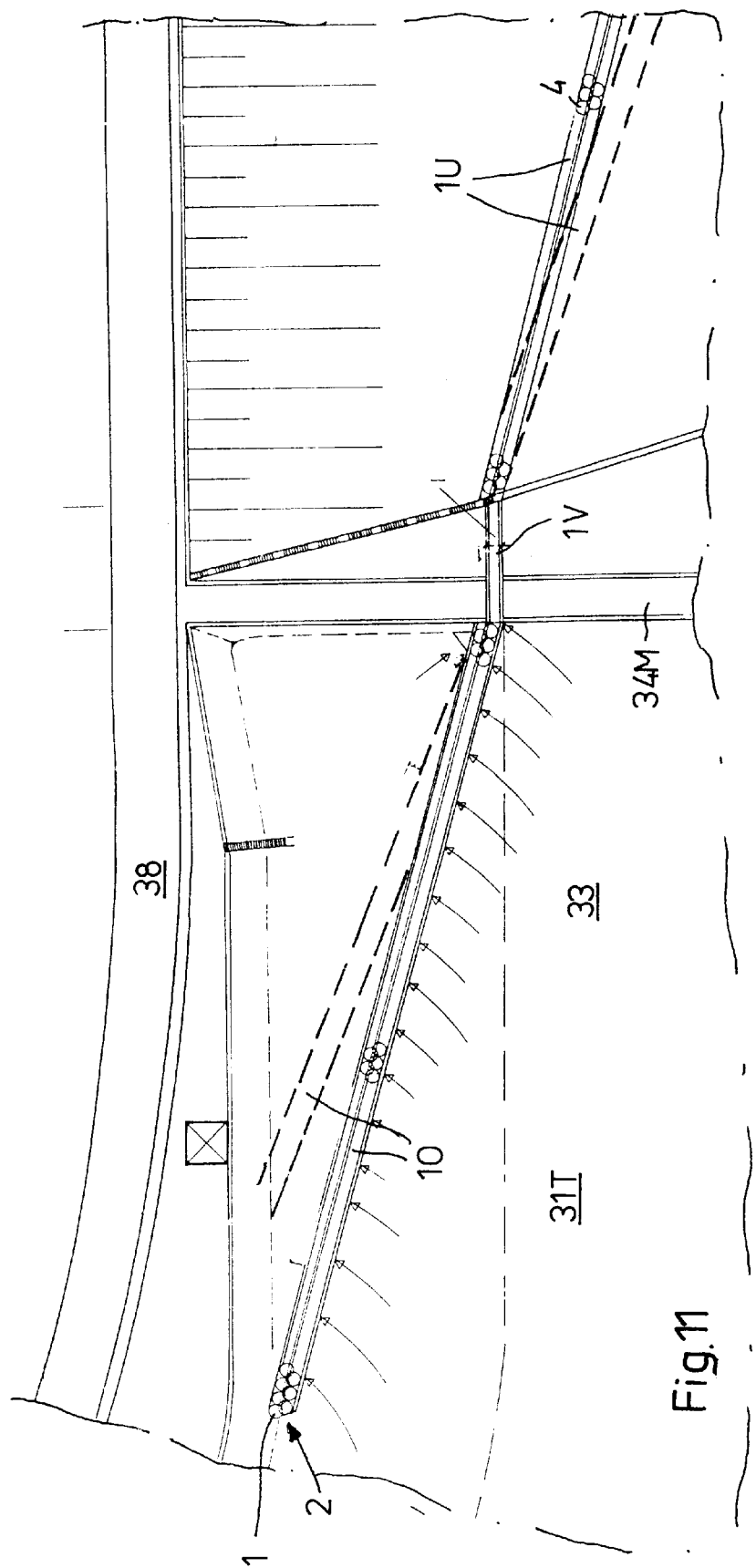
FIGS. 11 through 15 show a connection of the fishway to a catchment reservoir. The construction process according to the invention is explained in detail based on the sectional drawings in FIGS. 16 through 19. In the drawings.
Figure 12:
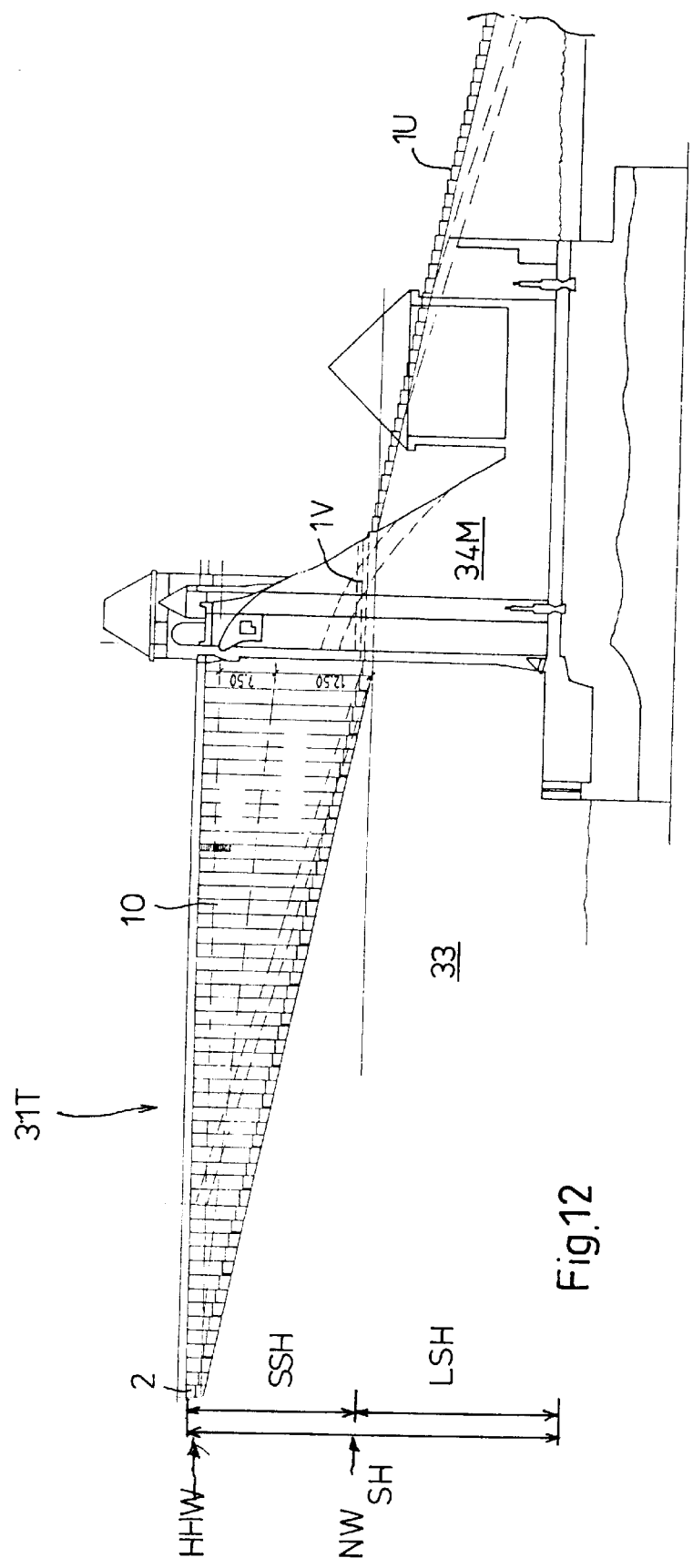

FIGS. 11 through 12 show a fishway (1) of glass-fiber cement according to FIGS. 3 and 4 that is integrated into a catchment reservoir (31T) to bypass a vertical descent (SH) created by a masonry dam (34M). In this case the vertical descent (SH) between a high water level (HHW) and tailwater level (UW) at the lowermost part of the base of the catchment reservoir is approximately 40 m. The entire fishway (1) substantially comprises three portions (1U, 1O, 1V), namely an upstream system portion (1O) on the reservoir side, a downstream system portion (1U) on the air space side and a connection channel (1V) connecting the two portions (1O, 1U) and passing through the masonry dam (34M).

The relationship between the vertical descent (SSH) on the reservoir side to the vertical descent (LSH) on the air space side is predetermined by the maximum difference between the high water level (HHW) and the low-water level (NW) in the reservoir area (33). Here, the maximum difference between the high water level (HHW) and the low water level (NW) is approximately 20 m, so each system portion (1U, 1O) must bypass 20 m.

The basins (4) located in the upstream portion (1O) of the system have at least one opening on the bottom, which can be opened or closed by means of a slide, particularly by a hydraulically operated slide, depending on the headwater level in the catchment reservoir (33). A combination with a float-actuated control is also advantageous. This ensures that at least the lowermost basin (4) on the reservoir side functions as an exit basin with a passage for the creatures inside the system, regardless of the headwater level (ZW) in the catchment reservoir (33).

The upstream and the downstream portion (1O, 1U) of the system extends along the same river bank (3 8), with the number of basins (4) and the basin type determining the slope (G) in the fishway (1)—the dashed line symbolizes the steepest variation. The length (height) of the basins (4) of the upstream portion (1O) of the system continuously increases from the uppermost to the lowermost basin (4) by the predetermined height of fall, with the lowermost basin (4) having a height from a parapet edge of the masonry dam (34M) to the edge of the river bank at low water level (NW). The basins (4) of the downstream portion (HU) of the system have the same height, a shorter surface line of the surface lines in the plane of symmetry of the basins (4) spans at least 70 cm.

To bypass a vertical descent (SH of 40 m, for example, 108 basins (4) are required in the upstream portion (1O) of the system at a fall height of 18 cm (flat version) and 79 basins (4) at a fall height of 25 cm (steepest version); the number of basins (4) in the downstream portion (1U) of the system amounts to 126 for the flat version or 92 for the steep version. The steep version saves a length of path of 25% in each portion (1U, 1O), which can result in considerable savings in the investment and installation costs. Different versions may, of course, be combined.

The through-flow slots (5) in each portion (1U, 1O) of the system run transversely to the existing slope (G), so that a meandering passage is formed.

Figure 13:
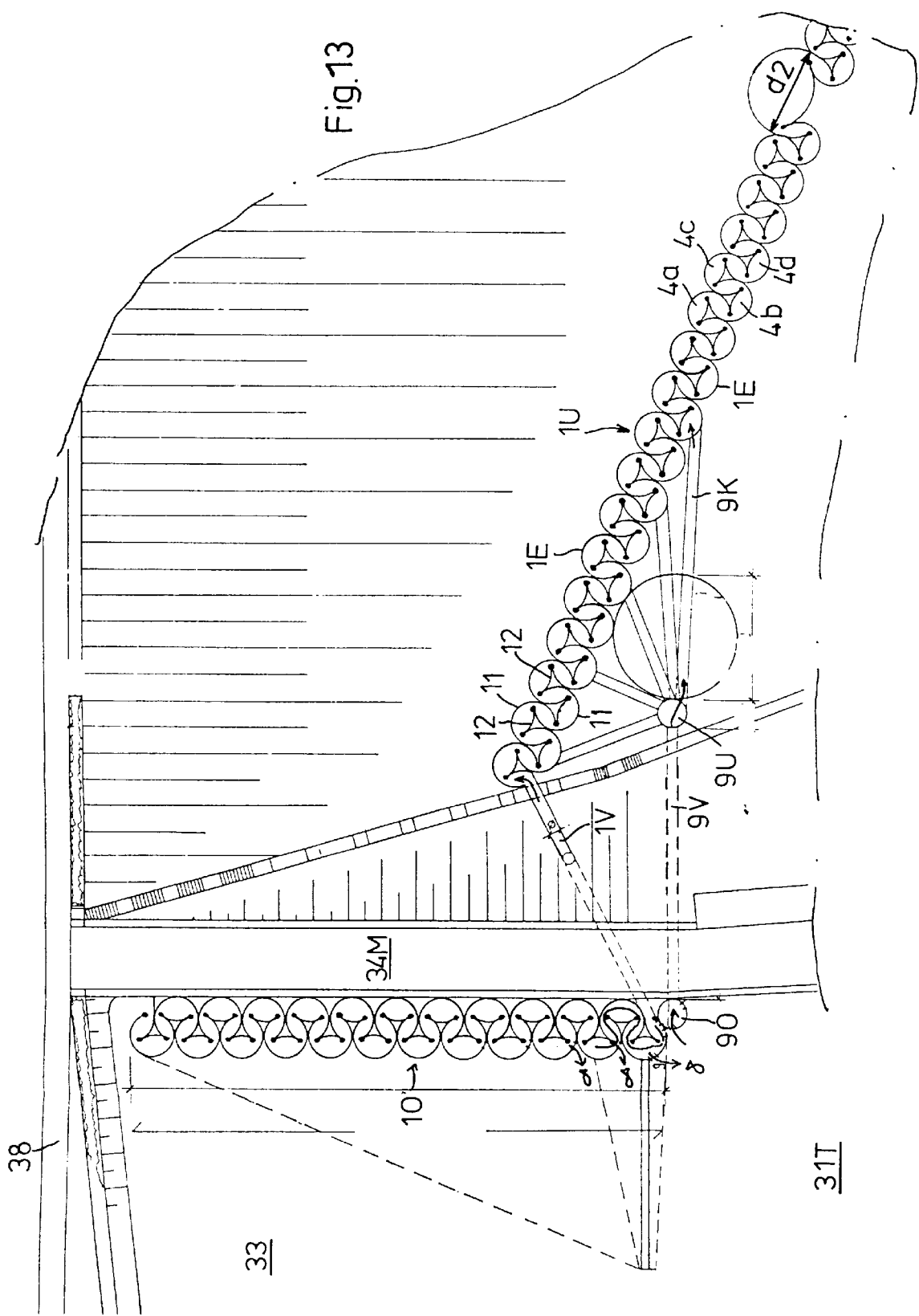
Figure 14:
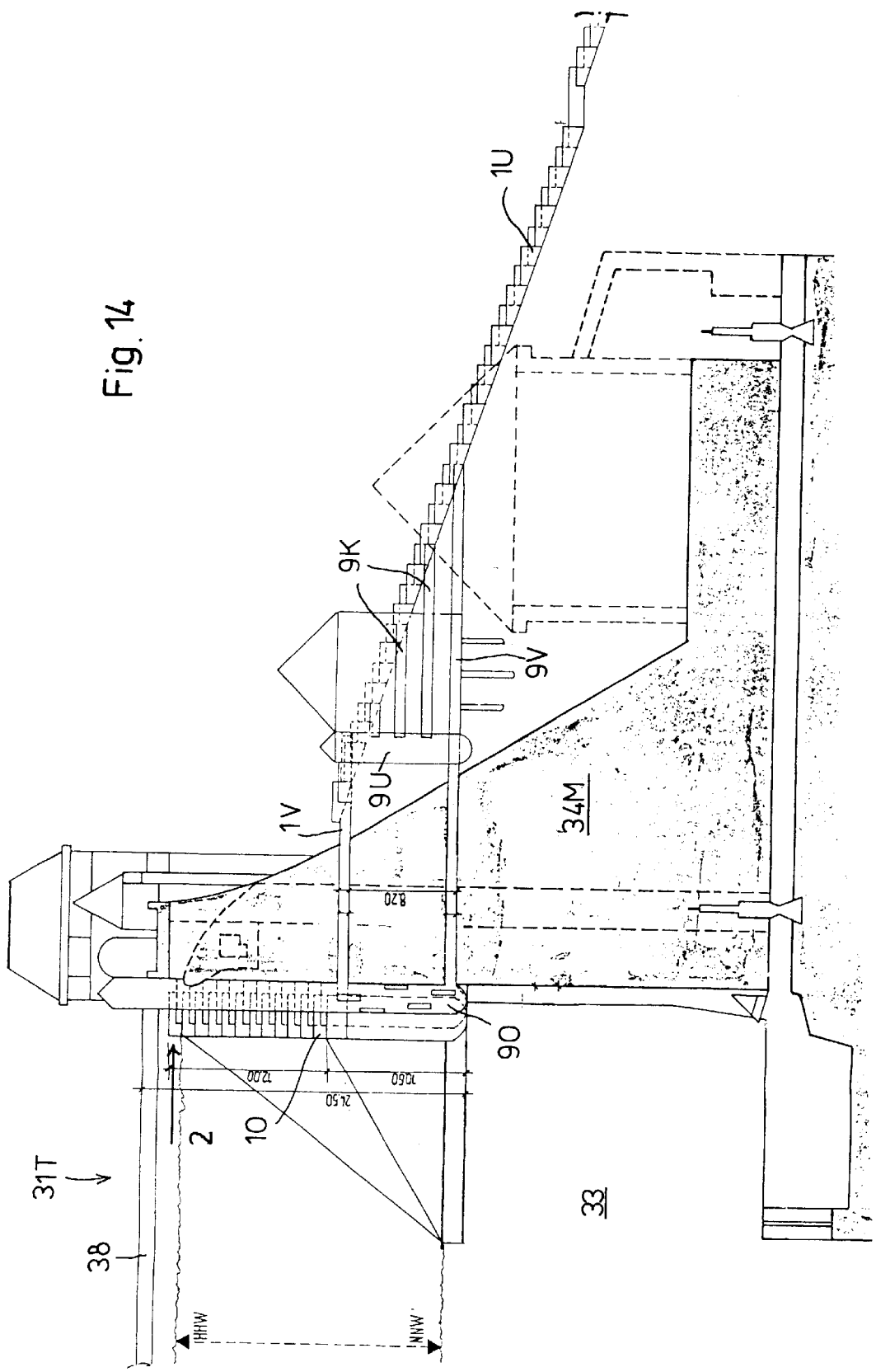
Figure 15:
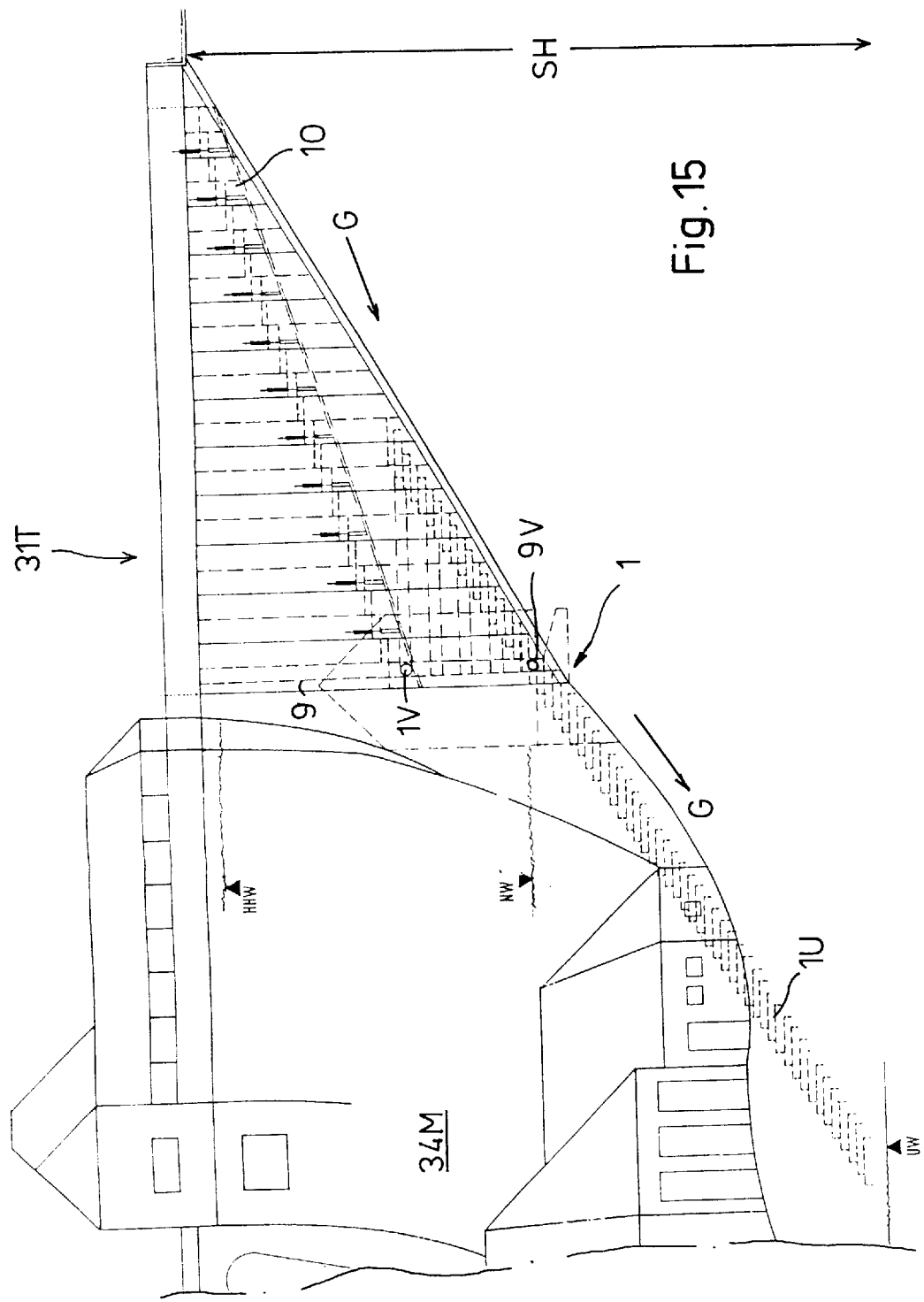

FIGS. 13 through 15 show a further embodiment of a fishway (1) integrated into a catchment reservoir (31T) in the form of a structure resting against an existing structure. This third embodiment of the fishway (1) is characterized by a very compact design.

For space reasons, at least the upstream portion (1O) of the system consists of basins (4) with three inner partial basins (4T) as shown in FIG. 10, since only a short distance is available for the upstream portion (1O) of the system. The slope (G) is approximately 30% here, with a height of fall of 25 cm. The upstream portion (1O) of the system is supported on the floor side by angular supporting walls projecting into the fluctuation area behind the masonry dam (34M).

The basins (4) according to FIG. 10 consist of two basin walls (11, 12), arranged in an opposite direction, made of pipe sections (41*, 42), with a first basin wall (11) having a center angle (4ZW) of approximately 340° and a second basin wall (12) having a center angle (4ZW) of approximately 60°. In the following, the first basin wall (11) is referred to as a long element and the second basin wall (12) as a short element, because of their different arc lengths.

The two piece parts (1E) forming the longitudinal sides of the fishway (1) comprise alternating successive short and long elements with the same radius. The short elements (12) connect adjoining edges (13a, 13b) of the longer pipe sections (41*) of the same orientation located immediately above and below. The center points (MP) of the long elements of the same orientation each form an imaginary straight line (G1, G2) extending in the direction of the slope (G). To form three elliptical partial basins (4T) with nearly identical cross sections within one basin (4), the two piece parts (1E) are arranged, interleaved and interlocking with undercuts, in the direction of the slope (G) so that the imaginary straight lines (G1, G2) have a small parallel distance from each other.

Each basin (4) has several constrictions (5E) as through-flow slots (5)—FIG. 10—which constrictions (5E) are formed between the deflection means (6) bounding the edges (13) of the inner basin walls (40) and the opposite inner basin wall (40). At an area (4AE) on the outflow side of each basin (4) a partially cylindrical pipe section (13) is provided as a second deflection means (63) on the inner basin wall (40) behind a constriction (5E). These second deflection means (63) are installed at a right angle to the slope (G) so that a flow (S) that passes tangentially along the inner basin wall (40) is generated in the through-flow slots (5).

In addition to the fishway (1) an inverted-siphon system (9) is integrated into the catchment reservoir (31T), which consists of an upstream vertical siphon tube (9O) on the reservoir side, and a downstream vertical siphon tube (9U) on the air space side, and a siphon channel (9V), which passes horizontally through the masonry dam (34M) and connects the two siphon tubes (9O, 9U). The downstream siphon tube (9U) is connected to the downstream portion of the fishway (1U) via a distribution channel (9K).

The inverted-siphon system (9) is required because the available path length in the upstream portion (1O) of the system is not sufficient to bypass the maximum difference between a high water level (HHW) and a low water level (NW) of approximately 20 m. With water levels (ZW) up to 12 m below the high water level, the vertical descent (SH) can be bypassed with the upstream portion (1O) of the system alone. Water levels below this intermediate water level (ZW) down to the low water level (NW), i.e., the remaining 8 m of the fluctuation range, are regulated via the inverted-siphon system (9). In the siphon tubes (9U, 9O), hydraulically operated slides are provided to equalize the amount of water to the downstream portion (1U) of the system.

Individual basins (4) of the downstream portion (1U) of the system are connected with the downstream siphon tube (9U) via further distribution channels (9K) so that fish counts can be performed for research purposes.

Additional resting basins (4R) with a significantly larger diameter (d2) relative to the diameter (d1) of the adjacent basins (4) are provided preferably in the downstream portion (1U) of the system.

FIGS. 16 through 19 show sectional plans for the construction of basins (4) according to FIGS. 1 through 4 for a fishway (1).

First a pipe (45) is cut into pipe sections of equal size with a length of at least 70 cm via cuts crosswise to the pipe axis (45A). These cuts are cuts (QR) perpendicular to the pipe axis (45A), alternating with cuts (QS) at a cutting angle ($\alpha$) to the pipe axis (45A), with the cutting angle ($\alpha$) predetermined by a slope (G) in the fishway (1). The cutting angle is between 10° and 40°, preferably between 15° and 20° for fishways (1) that are installed in flowing watercourses (31F), and between 20° and 30° for fishways (1) that are integrated into catchment reservoirs (31T).

A sector piece (42) is subsequently cut from each of the individual pipe sections (45T) with coaxial cuts (KS) parallel to the pipe axis (45A) on one side of the plane of symmetry (SE), in such a way that pipe sections (45T) with a partially cylindrical shape and opening are obtained. The resulting pipe sections (41, 41 *) form a first basin wall (11) of a partially cylindrical basin (4).

The pipe (45) has a diameter (d1) of 0.8 to 5 m, preferably 1 to 3 m. Commercially available pipes (45) of fiber cement, glass-fiber cement or the like are preferably used as the starting material.

Figure 16:
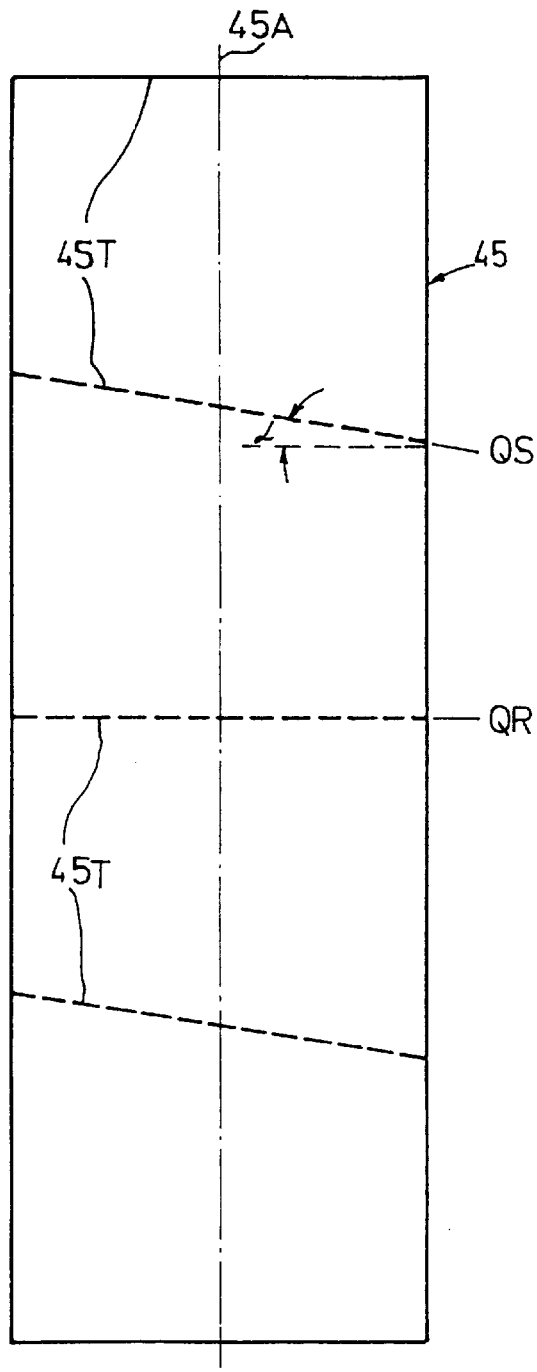
FIG. 16 shows a sectional plan for a method of constructing semi-cylindrical basins for a fishway.
Figure 17:
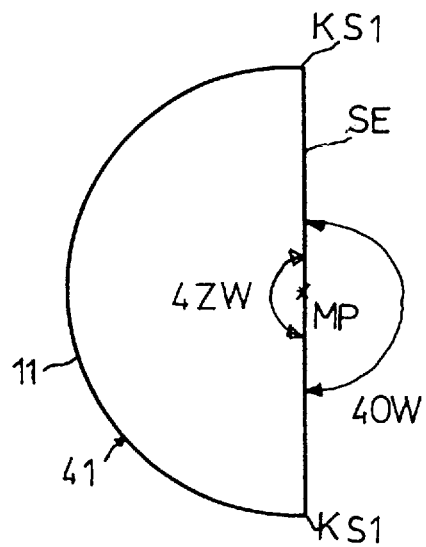
FIG. 17 shows a top view of a semi-cylindrical basin.

With the process illustrated in FIGS. 16 and 17, basins (4) are constructed with a semicircular base area (4G). For this purpose each of the individual pipe sections (45T) are divided into two equally sized halves (41) with coaxial cuts (KS) located in their plane of symmetry (SE), which halves can be integrated into the fishway (1) as first basin walls (11) for the formation of a semi-cylindrical basin (4).

Figure 18:
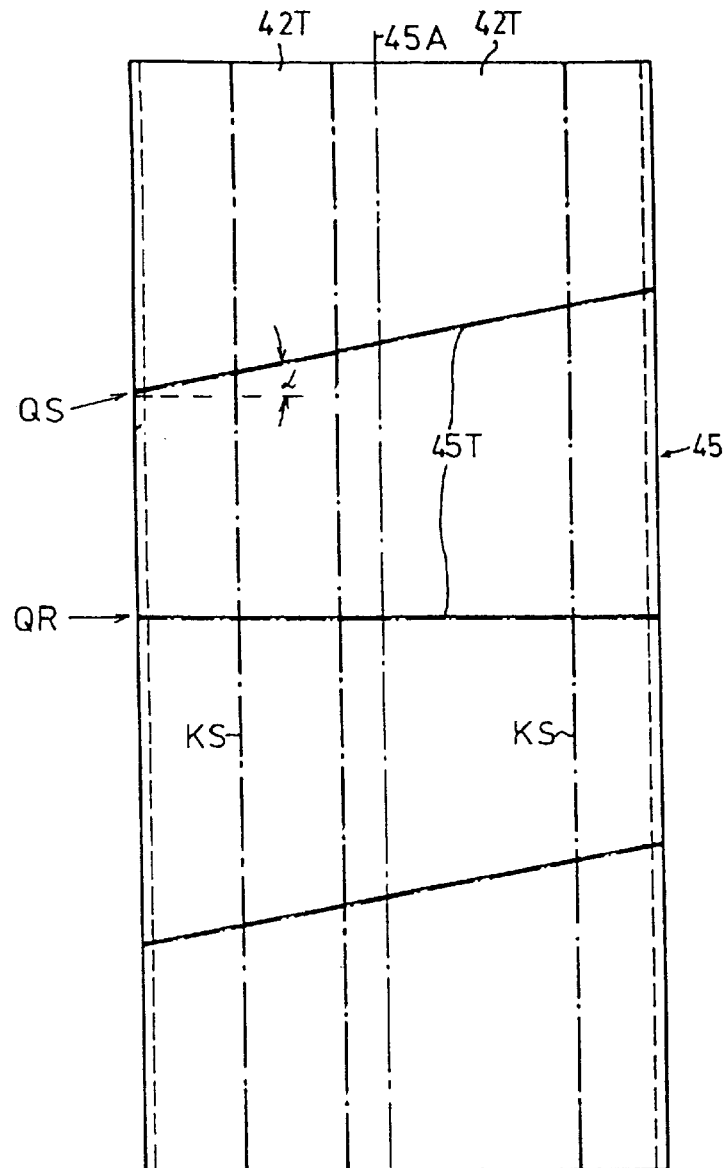
FIG. 18 shows a sectional plan for a method of constructing nearly cylindrical basins with an opening for a fishway.
Figure 19:
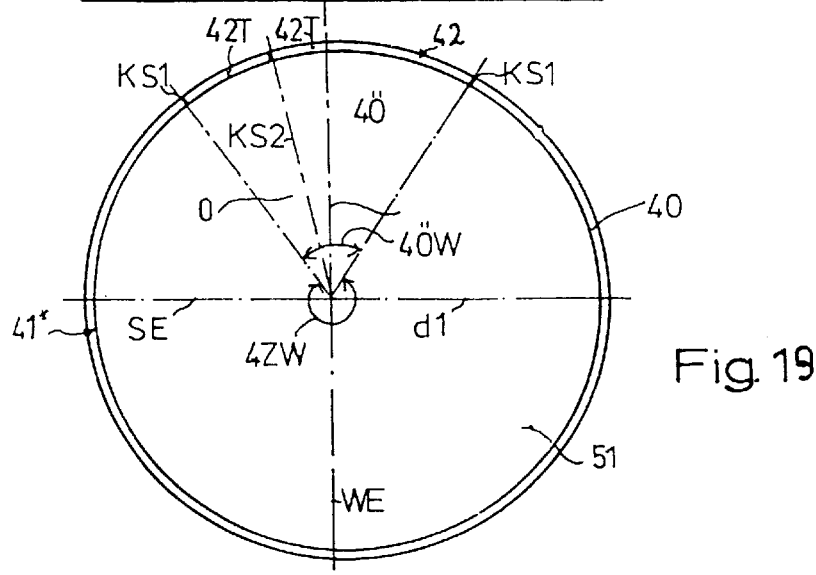
FIG. 19 shows a top view of basins with a segment of a circle as the base area.

With the process illustrated in FIGS. 18 and 19, basins (4) with a circular segment as the base area (4G) are constructed in which the opening (4Ö) that results after the sector piece (42) has been cut out, has a center angle (ZW) between 10° and 180°, preferably between 20° and 60°. The sector piece (42) is cut from the pipe section (45T) in the area in which a bisecting plane of an angle (WE) of the formed sector (42, 4Ö) is perpendicular to the plane of symmetry (SE).

With further coaxial cuts the removed sector piece (42) is separated into at least two partial sections (42T) to produce connection pieces (42) forming second basin walls (12). These connection pieces (42) are used to close the gap between adjacent edges (13a, 13b) of adjacent basins (4a, 4c, 4b, 4d) with the same orientation.

What is claimed is:

1. A fishway to bypass a vertical descent with an upstream water inlet (2) and a downstream water outlet (3) and with basins (4) arranged between them substantially in a downstream direction (G), each of which has an inflow slot (5Z) and an outflow slot (5A) as vertical through-flow slots (5), and deflection means (6) to form a meandering passage, characterized in that the basins (4) each have a partially cylindrical inner basin wall (40) and that the successive basins (4a, 4b, 4c) are oriented against one another and offset laterally in such a way that the through-flow slots (5) run transversely to the direction of slope (G) and that the through-flow slots (5) each are bounded on both sides by a vertical partially cylindrical pipe (60) as a first deflection means (6) with a significantly smaller radius along the entire basin height relative to the radius of the inner basin walls (40).

2. A fishway according to claim 1, characterized in that over the first partially cylindrical pipe (60) at least one second, shorter vertical partially cylindrical pipe (61, 62) is provided with a somewhat larger interior diameter compared to an exterior diameter of the pipe (60, 61) provided immediately underneath, so that a change in cross section results above the height of the through-flow slot (5).

3. A fishway according to claim 1, characterized in that the width of the through-flow slot (5) is at least 30 mm, preferably at least 45 mm.

4. A fish ladder according to claim 1, characterized in that the basins (4) have an identical base area (4G).

5. A fish ladder according to claim 1, characterized in that successive basins (4, 4a, 4b, 4c) have a height difference (height of fall) from one basin to the other of approximately 10 to 25 cm, preferably 15 cm.

6. A fish ladder according to claim 1, characterized in that the shorter surface line of the surface lines located in the plane of symmetry (SE) of a basin (4) is at least 70 cm.

7. A fish ladder according to claim 1, characterized in that the basin walls (40) of an individual basin (4) are formed by a partially cylindrical pipe section (41, 41*) as a first basin wall (11) and an opposite segment (42, 42*) as a second basin wall (12) and the segment (42) connects, as a connection piece, adjacent edges (13a, 13b) of the pipe sections immediately above and below belonging to the opposite basins (4a, 4c) and these edges (13a, 13b) are encompassed by the first deflection means (6).

8. A fishway according to claim 7, characterized in that the pipe section (41*) has a center angle (4ZW) larger than 180°, preferably 340°, and the segment (42, 42*) is arranged inside the pipe section (41*) in such a way that partial basins (4T) of nearly identical areas with an elliptic cross section are produced within a basin (4) and constrictions (5E) are produced as through-flow slots (5) between the deflection means (6) and the opposite inner basin walls (11, 12).

9. A fishway according to claim 8, characterized in that a partially cylindrical pipe section (13) is provided behind part of the constrictions (5E) as a second deflection means (62).

10. A fishway according to claim 7, characterized in that the pipe section (41) has a center angle (4ZW) of 180° and the segment (42, 42*) is arranged on the diameter of the semicircle.

11. A fishway according to claim 7, characterized in that the second basin wall (12) is a pipe sector (42) with a shorter arc length relative to the arc length of the first basin wall (11) and that it curves in the opposite direction toward the opposite inner basin wall (40) to form an individual basin (4).

12. A fishway according to claim 7, characterized in that the second basin wall (12) is a slab (42*) whose length is shorter than the diameter (d1) of the basins (4).

13. A fishway according to claim 7, characterized in that the basins (4) have a basin floor (28) with a rough texture to form a gap system (30) for which sediments (29S) of fist size to child's head size and/or an amorphous wide-mesh mat (29M) with interconnected hollow spaces are provided along the floor of the basins (4).

14. A fish ladder according to claim 1, characterized in that the pipe section (41, 41 *), as a circular arc, has a center angle (4ZW) larger than 180°, preferably 300°, and that, to form a single basin (4), the segment (42, 42*) is arranged on a chord forming the circular arc, so that the area of the segment of the circle forming the base (4G) of the basin (4) is larger than the area of a semicircle.

15. A fishway according to claim 14, characterized in that, to form a step in their outlet area (4AB) the basins (4) have a counter-berm (8) with a basin floor (28), which is horizontal or rises slightly against the slope (G).

16. A fishway according to claim 14, characterized in that the segment (42, 42*) and the immediately adjoining pipe section (41*) each have a semi-circular cutout (18) on the upper edge (16) of a common corner, with the center points of the areas of the semicircle being located in one axis (A) and a semi-circular shell (22) inserted into the cut-outs (18) as a flow-off channel (22).

17. A fishway according to claim 1, characterized in that the center points of the basins (4a, 4b; 4c, 4d) with the same orientation each form an imaginary straight line (G1, G2) extending in the direction of the slope.

18. A fishway according to claim 17, characterized in that the center points are spaced at an equal distance.

19. A fishway according to claim 1, characterized in that the fishway is a construction unit (1) forming a bypass around a dam (34) built to dam a flowing watercourse (31F), and that it is connected to said flowing watercourse (31F) by means of laterally secured connection trenches (32, 35), with an upstream connection trench (32) leading out of the reservoir area (33) in front of the dam (34) and a downstream connection trench (35) leading into the downstream region (36) below the dam (34).

20. A fishway according to claim 19, characterized in that the connection trench (35) discharges into the downstream region (36) at an acute angle of preferably 30° to the corresponding river bank.

21. A fishway according to claim 19, characterized in that a guiding and deflection means whose end facing the fishway is located in the discharge area of the downstream connection trench (35) extends crosswise in the downstream region between the lateral river banks (38).

22. A fishway according to claim 1, characterized in that the fishway is a multi-part fishway (1) forming a bypass to bypass a masonry dam (34M) of a catchment basin (31T) in which an upstream portion (1O) of the system on the reservoir side of the masonry dam (34M) and a downstream portion (1U) of the system on the air space side of the masonry dam (34M) are provided with a connection trench (35) to the downstrean region (36), and both portions (1O, 1U) are connected via a connection channel (1V) that passes through the masonry dam (34M).

23. A fishway according to claim 1, characterized in that the fishway comprises pre-assembled piece parts (1E) with pipe sections (41, 41*) of the the fishway orientation and connection pieces (42, 42*) between them, which can be anchored with separate foundations (43) on a floor slab (28P) in the area of the river bank (44).

24. A process to construct a basin for/in a fishway, particularly according to claim 1, comprising the steps of:

separating a pipe into a plurality of pipe sections (45T) of the same size by means of cross cuts (QR) perpendicular to the pipe axis (45A) alternating with cross cuts (QS) at a cutting angle (W) to the pipe axis (45A), with the cutting angle (W) determined by the slope (G) in the fishway (1), and subsequently using the individual pipe sections (45T) to construct at least one partially cylindrical basin wall (40) by means of coaxial cuts (KS) parallel to the pipe axis (45A).

25. A process according to claim 24, characterized in that the cutting angle (w) α lies between from 10 and 40°, preferably from 15° and 20° for flowing watercourses (31F) and between 20° and 30° for fishways (1) that are integrated into catchment reservoirs (31T).

26. A process according to claim 24, characterized in that the pipe sections (45T) have a length of at least 70 cm.

27. A process according to claim 24, further comprising the step of:

cutting a sector piece (42) from the individual pipe sections (45T) to form a basin wall (40) with an opening (4Ö) by means of coaxial cuts (KS) arranged on one side of its plane or symmetry (SE).

28. A process according to claim 27, characterized in that the sector piece (42) is cut from the pipe section (45T) in the area in which a plane (WE) bisecting the angle of the opening (40) is perpendicular to the plane of symmetry (SE).

29. A process according to claim 27, characterized in that the sector piece (42) has a center angle (4ZW) between 10 and 180°, preferably between 20 and 60°.

30. A process according to claim 24, comprising the steps of:

dividing the individual pipe sections (45T) into two halves (41) of equal size by means of coaxial cuts (KS1) along their planes of symmetry (SE) and integrating these halves into the fishway (1) as basin walls (40) to form a semi-cylindrical basin (41).

31. A process according to claim 24, further comprising the steps of:

dividing the sector piece (42) by means of at least one further coaxial cut (KS2) into at least two segments (42T) and integrating the two segments into the fishway (1) between adjacent edges (13a, 13b) of adjacent basin walls (4a, 4c) with the same orientation to form a basin (4).

32. A process according to claim 24, characterized in that the pipe (45) has a diameter (d1) of 0.8 to 5 m, preferably 1 to 3 m.

33. A process according to claim 24, characterized in that the pipes (45) are made of fiber cement or glass-fiber cement.

34. The fishway to bypass a vertical descent in a catchment reservoir created by a masonry dam, with an upstream portion (1O) of the system on the reservoir side and a downstream portion (1U) of the system on the air space side, and between them a connection channel (1V) passing through the masonry dam (61), in which the portions (1U, 1O) comprise a plurality of successive basins (4) with partially cylindrical inner basin walls (40) to form a meandering passage and furthermore comprise constrictions (SE) as through-flow slots (5), and the basins (4) located in the upstream portion (1O) of the system have at least one opening on the floor side, whose passableness for the creatures who are migrating upstream can be regulated by a slide depending on the amount of water present in the catchment reservoir, wherein the successive basins (4a, 4b, 4c, 4d) have alternating orientations and are laterally offset from each other so that the through-flow slots (5) in each portion (1U, 1O) of the system run transversely to the existing slope (G) and that the through-flow slots (5) are bounded along the entire basin height by a vertical partially cylindrical pipe (60) as a first deflection means (6) with a significantly smaller radius relative the radius of the inner basin walls (40).

35. A fishway according to claim 34, characterized in that one single basin (4) is formed by two basin walls (11, 12) that are oriented against one another, of which a first basin wall (11) has a center angle (4ZW) of approximately 340° and a second basin wall (12) has a center angle (4ZW) of approximately 60°, and the second basin wall (12) is a connection piece (42, 42*) to connect adjoining edges (13a, 13b) of the basin walls (40) immediately above and below belonging to the opposite basins (4a, 4c; 4b, 4d).

36. A fishway according to claim 34, characterized in that the center points of the basins (4) with the same orientation each form an imaginary straight line (G1, G2) extending in the direction of the slope (G) and the straight lines (G1, G2) have a small parallel distance from one another, so that three partial basins are created within one basin (4).

37. A fishway according to one or several of the claims 34 to 36, characterized in that the fishway has a slope (G) of approximately 30°.

38. A fishway according to claim 34, characterized in that the basins (4) in the upstream portion (1O) extend from one parapet edge of the masonry dam (34M) maximally to the bottom of the catchment reservoir and the height of the basin (4) in the downstream portion (1U) amounts to at least 70 cm.

39. A fishway according to claim 25, characterized in that in addition to the fishway (1) an inverted-siphon system (9) is integrated into the catchment reservoir (31 T), which comprises an upstream vertical siphon tube (9O) on the reservoir side and a downstream vertical siphon tube (9U) on the air space side and a siphon channel (9V), which passes horizontally through the masonry dam (34M) and connects the two siphon tubes (9O, 9U), and that the downstream siphon tube (9U) is connected to the downstream portion (1U) of the fishway (1) via at least one distribution channel (9K), and that both siphon tubes (1U, 1O) have openings that can be closed by means of a slide to balance the water level in the downstream portion (1U) of the system.

40. A fishway according to claim 39, characterized in that several basins (4) of the downstream portion (IU) are connected to the downstream siphon tube (9U) by means of additional distribution channels.

41. A fishway according to claim 34, characterized in that at least one resting basin (4R) with a significantly larger diameter (d2) relative to the diameter (d1) of the adjacent basins (4) is integrated into the downstream portion (1U) of the fishway (1).

* * * * *